United States Patent
Zhou et al.

(10) Patent No.: US 9,907,059 B1
(45) Date of Patent: Feb. 27, 2018

(54) COMPENSATING DELAY SPREAD IN COORDINATED UPLINK COMMUNICATIONS

(71) Applicant: Sprint Spectrum L.P., Overland Park, KS (US)

(72) Inventors: Yu Zhou, Herndon, VA (US); Muhammad Ahsan Naim, Ashburn, VA (US); Luca Zappaterra, Eindhoven (NL)

(73) Assignee: Sprint Spectrum L.P., Overland Park, KS (US)

( * ) Notice: Subject to any disclaimer, the term of this patent is extended or adjusted under 35 U.S.C. 154(b) by 84 days.

(21) Appl. No.: 15/167,395

(22) Filed: May 27, 2016

(51) Int. Cl.
| | |
|---|---|
| *H04W 72/04* | (2009.01) |
| *H04L 5/00* | (2006.01) |
| *H04W 92/10* | (2009.01) |
| *H04W 88/08* | (2009.01) |
| *H04W 88/02* | (2009.01) |

(52) U.S. Cl.
CPC ......... *H04W 72/0413* (2013.01); *H04L 5/001* (2013.01); *H04L 5/0035* (2013.01); *H04W 72/0453* (2013.01); *H04W 88/02* (2013.01); *H04W 88/08* (2013.01); *H04W 92/10* (2013.01)

(58) Field of Classification Search
CPC ......... H04W 72/0413; H04W 72/0453; H04W 92/10; H04W 88/08; H04W 88/02; H04L 5/001; H04L 5/0035
See application file for complete search history.

(56) References Cited

U.S. PATENT DOCUMENTS

| | | | | |
|---|---|---|---|---|
| 8,874,151 B2 * | 10/2014 | Ogawa | ................. | H04B 7/024 455/101 |
| 2010/0265904 A1 * | 10/2010 | Yang | .................... | H04J 11/0053 370/329 |
| 2012/0327897 A1 * | 12/2012 | Huang | ............... | H04W 72/005 370/330 |
| 2014/0334402 A1 * | 11/2014 | Chen | .................... | H04L 5/0035 370/329 |
| 2015/0280955 A1 * | 10/2015 | Wild | .................... | H04L 5/0023 375/260 |
| 2015/0334762 A1 * | 11/2015 | Yang | .................... | H04W 28/18 370/329 |
| 2017/0055281 A1 * | 2/2017 | Islam | ............... | H04W 72/0446 |

FOREIGN PATENT DOCUMENTS

WO     WO2015154810     10/2015

* cited by examiner

*Primary Examiner* — Brian D Nguyen

(57) ABSTRACT

Disclosed is a method and system for compensating excessive delay spread in uplink coordinated multipoint service. An uplink data-unit transmitted by a user equipment device (UE) on a first uplink air interface to a first base station (BS) using a first group of sub-carrier frequencies may be received at a time that is within an alignment-time range for simultaneously decoding uplink data-units from UEs transmitting on the first uplink. A determination is made that the uplink data-unit transmitted simultaneously by the UE on a second uplink air interface using a second group of sub-carrier frequencies will be received at a second BS at a time that is time is beyond the alignment-time range for simultaneously decoding uplink data-units from UEs transmitting on the second uplink. Decoding of the received uplink data-unit at the second BS is then delayed until a start time beyond the end of the alignment-time range.

20 Claims, 12 Drawing Sheets

COMPENSATING DELAY SPREAD IN COORDINATED UPLINK COMMUNICATIONS

BACKGROUND

A typical cellular wireless network includes a number of base stations each radiating to define a respective coverage area, such as a "cell" or "sector" (e.g., a subdivision of a cell), in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Depending on the specific underlying technologies and architecture of a given wireless communication network, base stations may take different forms. In a code division multiple access (CDMA) system configured to operate according IS-2000 and IS-856 standards, for example, a base station may include a base transceiver system (BTS) under the control of a base station controller (BSC). In a universal mobile telecommunications system (UMTS) configured to operate according to ITU IMT-2000 standards, the base station is usually referred to as a NodeB, and is usually under the control of a radio network controller (RNC). In a UMTS network configured to operate to Long Term Evolution (LTE) standards, evolved NodeBs (eNodeBs) may communicate directly with one another, while under functional coordination of a mobility management entity (MME). Other base station architectures and operational configurations are possible as well.

Further, a wireless network may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, wireless wide area network (WWAN) protocols such as Orthogonal Frequency Division Multiple Access (OFDMA (e.g., Long Term Evolution (LTE), LTE Advanced and Wireless Interoperability for Microwave Access (WiMAX)), Code Division Multiple Access (CDMA) (e.g., 1×RTT and 1×EV-DO), and Global System for Mobile Communications (GSM), and wireless local area network (WLAN) protocols such as IEEE 802.11 (WIFI), BLUETOOTH, and others. Each protocol may define its own procedures for registration of UEs, initiation of communications, handover or handoff between coverage areas, and other functions related to air interface communication.

In practice, a base station, such as an eNodeB, may be configured to provide service to UEs on multiple carrier frequencies or "carriers." Each carrier could be a time division duplex (TDD) carrier that defines a single frequency channel multiplexed over time between downlink and uplink use, or a frequency division duplex (FDD) carrier that defines two separate frequency channels, one for downlink communication and one for uplink communication. Each frequency channel of a carrier may then occupy a particular frequency bandwidth (e.g., 1.4 MHz, 3 MHz, 5 MHz, 10 MHz, or 20 MHz) defining a range of frequency at a particular position (e.g., defined by a center frequency) in a radio frequency band (e.g., in the 800 MHz band, the 1.9 GHz band, or the 2.5 GHz band).

Each carrier may also define various logical channels to facilitate communication between the base station and one or more served UEs. For instance, on the downlink, a carrier may define a reference channel on which the base station broadcasts a reference signal useable by UEs to detect and evaluate coverage, various other downlink control channels to carry control signaling (such as resource-scheduling directives) to UEs, and one or more shared or traffic channels for carrying bearer data (e.g., user or application level data) to UEs. And on the uplink, a carrier may define one or more uplink control channels to carry control signaling (such as resource scheduling requests, channel state reports, and the like) from UEs, and one or more shared or traffic channels for carrying bearer data from UEs. In practice, the shared or traffic channels may define particular physical resources for carrying data between the base station and UEs.

When a UE enters into a cell or sector (or more generally, coverage area) of a base station, the UE may attach, register, or otherwise associate with the base station, and the base station may then serve the UE on one or more carriers. The base station may then be referred to as the UE's "serving" base station. Herein, the term "serving" will, in general, be used to describe a particular base station as such only when it is not otherwise apparent from context. In practice, the process of serving the UE may involve the serving base station allocating use of particular air interface resources, such as traffic channels or portions thereof, to carry data communications to and from the UE, and managing transmission on those resources, such as controlling what modulation scheme is used for the transmissions.

For instance, when the serving base station has data to transmit to the UE, the serving base station may select certain downlink resources to carry the data and may determine a modulation scheme for transmission on those resources, and the base station may then (i) transmit to the UE a scheduling directive instructing the UE to receive the data on the scheduled resources using the determined modulation scheme, and (ii) transmit the data on the indicated downlink resources using the determined modulation scheme. Likewise, when the serving base station receives from the UE a request for the UE to transmit data to the base station, the base station may select certain uplink resources to carry the data and may determine a modulation scheme for transmission on those resources, and the base station may then (i) transmit to the UE a scheduling directive instructing the UE to transmit the data on the scheduled resources using the determined modulation scheme and (ii) receive the transmission from the UE accordingly.

A UE may also move between neighboring coverage areas of base stations. More specifically, as a UE moves between wireless coverage areas of a wireless communication system, or when network conditions change or for other reasons, the UE may "handover" (or "hand off") from operating in one coverage area (e.g., a serving coverage area) to operating in another coverage area. In a usual case, this handover process is triggered by the UE monitoring the signal strength of various nearby available coverage areas, and the serving base station (or some other controlling network entity) determining when one or more threshold criteria are met. For instance, a UE may continuously monitor signal strength from various available coverage areas and notify its serving base station when a given coverage area has a signal strength that is sufficiently higher than that of the serving base station. The serving base station (or some other controlling network entity) may then direct the UE to handover to the base station of the given coverage area. By convention, a UE is said to handover from a "source" base station (or source coverage area) to a "target" base station (or target coverage area). At the time that a handover is triggered, the source base station is the UE's serving base station.

OVERVIEW

Communications from a base station to a UE are carried on a "forward link" (e.g., in a CDMA system) or "downlink" (e.g., in a UMTS/LTE network) of an air interface between the UE and base station, and communications from a UE to the base station are carried on "reverse link" (e.g., in a CDMA system) or "uplink" (e.g., in a UMTS/LTE network) of the air interface. By way of example, the discussion herein will be made with reference to LTE, and the terms downlink and uplink will therefore be adopted. However, it should be understood that discussion applies as well to forward and reverse links.

In an effort to improve the quality of service at cell edges, a wireless communication network may deploy advances, updates, and/or revisions to access technologies that enable duplicate, simultaneous transmissions on multiple downlinks from multiple base stations to a UE, and/or duplicate, simultaneous transmissions on multiple uplinks from a single UE to multiple base stations. The multiply-received transmissions may then be combined or merged to achieve a higher aggregate signal quality (e.g., an aggregate signal-to-noise ratio) than any one of the multiple transmissions. For example, a UE may merge multiply-received downlink transmissions. Similarly, a coordinating entity among multiple base stations may merge respective uplink transmissions received by the multiple base stations from a single UE.

By way of example, LTE Advanced introduced techniques and protocols for coordinating downlink and uplink transmissions among neighboring base stations and the UEs they serve. Referred to as "Coordinated Multipoint" or "CoMP" service, the techniques and protocols include a number of CoMP schemes aimed at enabling a group or cluster of base stations to coordinate transmission and/or reception in order to avoid inter-cell interference and thereby improve service at cell edges, and in some cases, to convert inter-cell interference into a usable signal that actually improves the quality of service that is provided.

Under LTE Advanced, a number of different CoMP schemes or modes have been defined for both the uplink (UL) and the downlink (DL). For the downlink, two basic types of downlink CoMP (or "DL CoMP") modes are set forth: joint processing (JP) schemes and coordinated scheduling/beamforming (CSCH or DL-CSCH) schemes. For the uplink, numerous types of uplink CoMP (or "UL CoMP") modes have been devised.

Uplink CoMP modes may involve interference rejection combining (IRC) or coordinated scheduling for purposes of reducing or preventing interference between transmissions from different UEs. Additionally or alternatively, various uplink CoMP modes may involve "joint reception" and/or "joint processing." Joint reception generally involves multiple base stations receiving an uplink signal that is transmitted to them simultaneously by a given UE, and then sending the respectively received signals or a decoded and/or processed version of the respectively received signals to one another, or to a master base station in the group, such that the multiple received versions of the UE's transmission can be combined or merged to improve reception and/or reduce interference.

In a typical joint reception mode of UL CoMP, a UE will have a serving CoMP base station and one or more CoMP participating base stations. For purposes of discussion herein, the term "CoMP UE" will be used to refer to a UE receiving service according to UL and/or DL CoMP, and a CoMP participating base station (or eNodeB) will be referred to simply as a "CoMP base station" (or "CoMP eNodeB"). The term "CoMP" will generally be omitted when referring to a serving base station (or eNodeB) of a CoMP UE. Note that a CoMP base station does in some sense "serve" a CoMP UE, though in a sort of secondary manner. One or more CoMP base stations and a serving CoMP base station form a "CoMP group" or "CoMP cluster."

One challenge facing UL CoMP is the precision of timing generally required for transmissions under LTE. More specifically, as described below, reception by a base station of transmissions from UEs on their respective uplinks must be synchronized to within a small tolerance—typically less than five microseconds ($\mu s$)—in order to enable a type of simultaneous decoding used in LTE. This is achieved largely by providing UEs with precise timing signals, and scheduling by the base station of uplink transmissions within synchronized transmission intervals. UEs may then transmit within their scheduled (or allocated) time intervals. Owing to variations in propagation times or delays (or propagation distance) between a base station and the UEs it serves, exactly synchronized reception will not be achieved. Rather, there will be a "delay spread" among reception times of uplink transmissions made during the same schedule transmission interval. Distance variations between UEs and their common serving base station are typically small enough so that the delay spread among the UEs will be within a tolerance window for which simultaneous decoding is possible. This may not be the case, however, if the base station is also acting as a CoMP base station receiving signals from a CoMP UE.

More particularly, a CoMP UE may be further away from a CoMP base station than other UEs for which the same base station is acting as a common serving base station. These other UEs are referred to herein as the base station's "native" UEs and are receiving primary service from the base station, whereas the CoMP UE is receiving CoMP (secondary) service from the base station, and is likely to be closer to its own serving base station. As a result, signals received at the CoMP base station from a CoMP UE may be delayed beyond the tolerance window for simultaneous decoding of the signals from the native UEs. Such excessively delayed signals cannot be decoded properly, and may also interfere with uplink transmissions scheduled for other UEs in subsequent transmission intervals. In a conventional approach for dealing with this situation, the CoMP base station either may be excluded from participating in a CoMP cluster for the UE, or may expand its tolerance window to accommodate the excessive delay of signals from the CoMP UE.

In either case, CoMP service and/or overall service quality may be subject to some degradation. Namely, if the base station is excluded from participating in CoMP service for the UE because of excessive delay, then the effectiveness of CoMP service for the UE may be diminished by the omission of a potential, additional uplink. And if the base station's tolerance window for delay spread is expanded, this can add overhead for all uplink transmissions, since increasing the size of the tolerance window comes at an expense to an overall time budget for all uplink transmissions. It would therefore be desirable to be able avoid excluding base stations from CoMP participation because of excessive delay spread of UL CoMP transmissions from CoMP UEs, without having to expand the tolerance window for delay spread. Accordingly, disclosed herein are example systems and methods for time shifting decoding at a CoMP base station of UL CoMP transmissions from a CoMP UE to accommodate excessive delay spread. The example systems and methods also adjust uplink scheduling strategies to avoid or eliminate interference of uplink transmissions that might otherwise result from the time-shifted decoding.

Hence, in one respect, various embodiments of the present invention provide a method operable in a wireless communication network including at least a first base station and a second base station both configured for serving user equipment devices (UEs), the method comprising: at the first base station, receiving, at a first arrival time, an uplink data-unit transmitted by a UE on a first uplink air interface using a first group of sub-carrier frequencies of a carrier band, wherein the first arrival time is within an alignment-time range for simultaneously decoding respective uplink data-units received at the first base station from UEs transmitting on the first uplink air interface using respective groups of sub-carrier frequencies of the carrier band; making a determination that the uplink data-unit transmitted simultaneously by the UE on a second uplink air interface using a second group of sub-carrier frequencies of the carrier band will be received at the second base station at a second arrival time, wherein the second arrival time is beyond the alignment-time range for simultaneously decoding respective uplink data-units received at the second base station from UEs transmitting on the second uplink air interface using respective groups of sub-carrier frequencies of the carrier band; in response to making the determination, delaying from a time within the alignment time range to the second arrival time, a start time for decoding at the second base station the uplink data-unit received from the UE on the second uplink air interface; and at the second base station, decoding, starting at the delayed start time, the uplink data-unit received from the UE on the second uplink air interface, thereby obtaining a second decoded data-unit.

In another respect, various embodiments of the present invention provide a wireless communication network comprising: a first base station for serving user equipment devices (UEs), the first base station including a transceiver; a second base station for serving UEs, the second base station including a transceiver; one or more processors distributed at least among the first base station and the second base station; and memory accessible to the one or more processors, and storing machine language instructions that, upon execution by the one or more processors, cause the wireless communication network to carry out operations including: receiving by the transceiver of first base station at a first arrival time, an uplink data-unit transmitted by a UE on a first uplink air interface using a first group of sub-carrier frequencies of a carrier band, wherein the first arrival time is within an alignment-time range for simultaneously decoding respective uplink data-units received at the first base station from UEs transmitting on the first uplink air interface using respective groups of sub-carrier frequencies of the carrier band; making a determination that the uplink data-unit transmitted simultaneously by the UE on a second uplink air interface using a second group of sub-carrier frequencies of the carrier band will be received by the transceiver of the second base station at a second arrival time, wherein the second arrival time is beyond the alignment-time range for simultaneously decoding respective uplink data-units received at the second base station from UEs transmitting on the second uplink air interface using respective groups of sub-carrier frequencies of the carrier band; in response to making the determination, delaying from a time within the alignment time range to the second arrival time, a start time for decoding at the second base station the uplink data-unit received from the UE on the second uplink air interface; and at the second base station, decoding, starting at the delayed start time, the uplink data-unit received from the UE on the second uplink air interface, thereby obtaining a second decoded data-unit.

Further, in still another respect, various embodiments of the present invention provide a base station configured for operating in a wireless communication network and for serving user equipment devices (UEs), the base station comprising: a transceiver; one or more processors; and memory accessible to the one or more processors, and storing machine language instructions that, upon execution by the one or more processors, cause the base station to carry out operations including: making a determination that an uplink data-unit transmitted by a UE on an uplink air interface using a group of sub-carrier frequencies of a carrier band will be received by the transceiver of the base station at an arrival time, wherein the arrival time is beyond an alignment-time range for simultaneously decoding respective uplink data-units received at the base station from UEs transmitting on the uplink air interface using respective groups of sub-carrier frequencies of the carrier band; in response to making the determination, delaying from a time within the alignment time range to the arrival time, a start time for decoding the uplink data-unit received from the UE on the uplink air interface; and decoding, starting at the delayed start time, the uplink data-unit received from the UE on the uplink air interface, thereby obtaining a decoded data-unit.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1A:
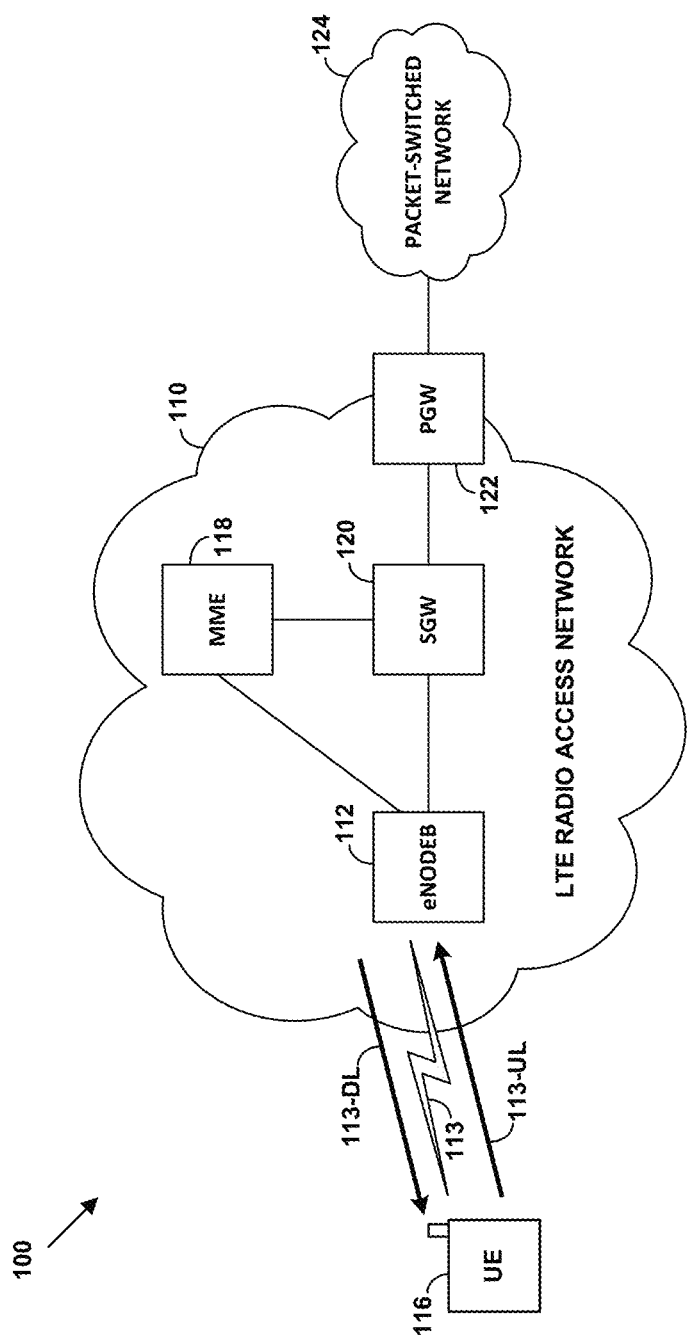
FIG. 1A is a simplified block diagram of a wireless communication network in which an example method can be implemented, in accordance with example embodiments.

Referring to the drawings, FIG. 1 is a simplified block diagram of a wireless communication system or network 100 in which an example of the present method can be implemented. In particular, FIG. 1 includes by way of example a representative LTE radio access network (RAN) 110 including an example LTE base station known as an eNodeB 112, which radiates to provide a wireless coverage area defining an LTE air interface 113 through which the eNodeB may serve one or more UEs. As shown, the air interface 113 supports downlink communications from the eNodeB 112 to the UE 116 on an air interface downlink 113-DL, and supports uplink communications from the UE 116 to the eNodeB 112 on an air interface uplink 113-UL.

The eNodeB 112 is then shown coupled with core LTE network infrastructure, which may include a mobility management entity (MME) 118, a serving gateway (SGW) 120 and a packet-data network gateway (PGW) 122 providing connectivity with a packet-switched network 124 such as the Internet. Shown within coverage of the eNodeB 112 is then a representative UE 116. In practice, the LTE access network may be operated by a cellular wireless service provider, and the UE may subscribe to service of that provider.

In general, a wireless service provider may operate one or more RANs, such as the LTE RAN 110, as a "public land mobile network" ("PLMN") for serving UEs (or other mobile terminals) that subscribe to service of the provider. For example, a service provider may operate an LTE RAN as an LTE PLMN and may provide UEs with subscriptions that allow the terminals to receive LTE service from that PLMN. As another example, a service provider may operate a CDMA RAN as a CDMA PLMN and may provide UEs with subscriptions that allow the terminals to receive CDMA service from that PLMN. And as another example, a service provider may operate both an LTE PLMN and a CDMA PLMN and may provide UEs with subscriptions that allow the UEs to receive both LTE service from the LTE PLMN and CDMA service from the CDMA PLMN.

In practice, a RAN operating as a PLMN may have an associated PLMN identifier (PLMN ID), and base stations of the RAN may be arranged to broadcast that PLMN ID to indicate that the base stations are part of that PLMN. UEs that subscribe to service of a wireless service provider's PLMN may then be provisioned with data indicating the PLMN ID of the PLMN and with logic that causes the UEs to prefer service by base stations broadcasting that PLMN ID. Further, UEs that subscribe to service of multiple PLMNs, such as both an LTE PLMN and a CDMA PLMN may be provisioned with data indicating the PLMN IDs of each such PLMN and with logic that causes the UEs to prefer service by base stations broadcasting one or more of those PLMN IDs.

A wireless service provider may also allow one or more of its PLMNs to serve UEs that subscribe to service of other PLMNs, pursuant to a roaming agreement. In particular, a first wireless service provider providing a first PLMN may enter into a roaming agreement with a second wireless service provider providing a second PLMN, according to which the first PLMN will serve UEs that subscribe to the second PLMN, and the second wireless service provider will compensate the first service provider for providing that service. As such, a given UE that subscribes to service of the second PLMN but that is not within sufficient coverage of the second PLMN may instead opt to be served by the first PLMN, in which case the given UE is said to be "roaming" in the first PLMN. The second wireless service provider may also provide reciprocal roaming service to UEs that subscribe to service of the first PLMN.

As noted above, a network such as communication network 100 may implement various types of coordinated multipoint (CoMP) service, through which base stations (e.g., eNodeBs) may coordinate to improve uplink and/or downlink service. CoMP schemes designed for coordinated transmission by base stations may be referred to as downlink CoMP modes, while CoMP schemes designed for coordinated reception may be referred to as uplink CoMP modes.

Figure 1B:
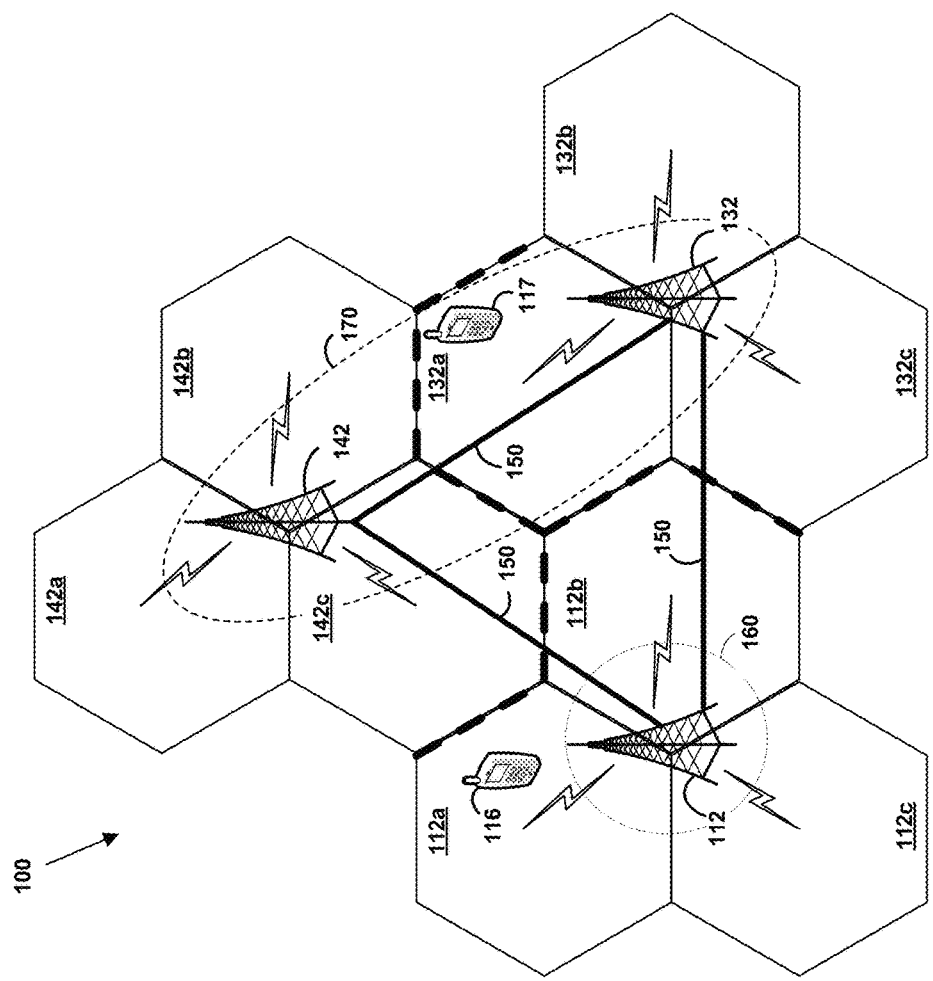
FIG. 1B is a simplified block diagram of a illustrating a portion of a communication network in which coordinate multipoint service may be implemented, in accordance with example embodiments.

FIG. 1B is a simplified block diagram illustrating a portion of the communication network 100 in which CoMP schemes may be implemented for uplink and/or downlink communications. In particular, FIG. 1B shows a portion of an LTE network, which includes three eNodeBs 112, 132, and 142. More or less eNodeBs, and/or other types of access points or base transceiver stations, are also possible. As shown, eNodeB 112 is serving three coverage areas or sectors 112a, 112b, and 112c; eNodeB 132 is serving three coverage areas or sectors 132a, 132b, and 132c; and eNodeB 142 is serving three coverage areas or sectors 142a, 142b, and 142c. Further, a UE 116 is operating in sector 112a, which is served by eNodeB 112. Further, while not shown in FIG. 1B, each of eNodeBs 112, 132, and 142 may be configured in the same or in a similar manner as the eNodeB 112 shown in FIG. 1A. For instance, each of eNodeBs 112, 132, and 142 may be communicatively coupled to an MME and/or an SGW. Further, note that some or all of eNodeBs 112, 132, and 142 may be communicatively coupled to the same MME and/or the same SGW. Alternatively, each of eNodeBs 112, 132, and 142 might be connected to a different MME and/or different SGW.

In some cases, uplink CoMP may be implemented by a single base station, which provides service in multiple sectors. This type of CoMP scheme may be referred to as an "intra base station" or "intra-eNodeB" CoMP scheme. For example, eNodeB 112 may provide uplink CoMP by utilizing and/or combining uplink signals from a UE that are received at two or more of the sectors 112a, 112b, and 112c that are served by eNodeB 112. In particular, eNodeB 112 may define a CoMP group 160 to include all its sectors 112a, 112b, and 112c. As such, eNodeB 112 may adaptively use joint processing techniques and/or interference rejection combining (IRC) techniques when the uplink signal from UE 116 is received at two or more of the sectors 112a, 112b, and 112c that it serves.

In other cases, uplink CoMP may be implemented by multiple base stations, which may each provide service in multiple sectors or only in one cell. This type of CoMP scheme may be referred to as an "inter base station" or "inter-eNodeB" CoMP scheme. For example, eNodeBs 132 and 142 may provide uplink CoMP by utilizing and/or combining uplink signals from UE 117 that are received at two or more of the sectors 132a, 132b, 132c, 142a, 142b, and 142c that are served by eNodeBs 132 and 142. To achieve this, eNodeBs 132 and 142 may be arranged to form a CoMP group or cluster 170. (Those skilled in the art will understand that in the context of CoMP the "uplink signals" received at different base stations result from the same uplink signal that is transmitted by the UE, but are different because the transmission is "perceived" differently in the different sectors.)

Figure 1C:
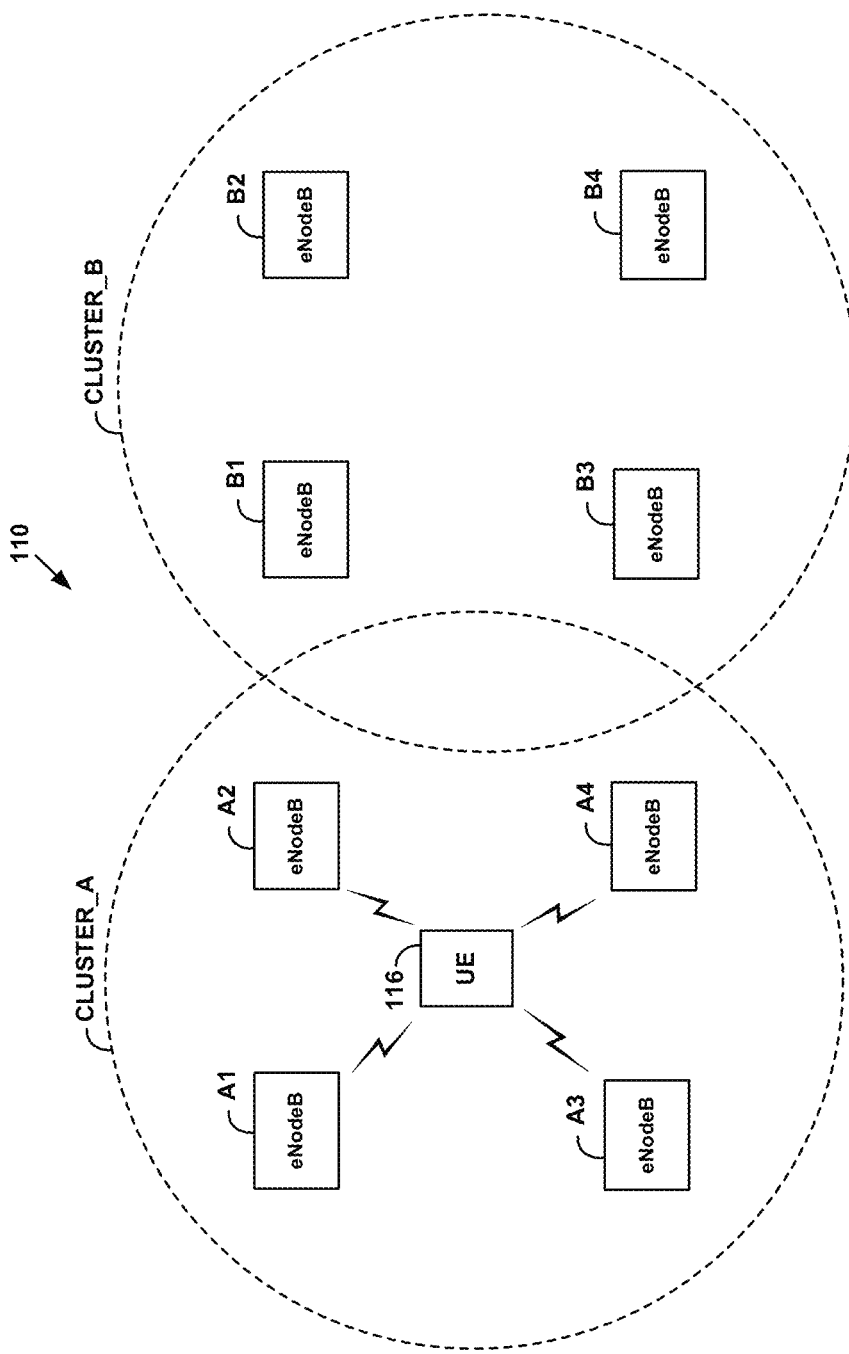
FIG. 1C is a simplified block diagram illustrating a portion of an LTE network in which inter-eNodeB CoMP service may be implemented, in accordance with example embodiments.

FIG. 1C is a simplified block diagram illustrating a portion of an LTE network in which inter-eNodeB CoMP service may be implemented. In particular, FIG. 1C shows a portion of an LTE network 110, which includes eNodeBs A1 to A4 and eNodeBs B1 to B4. Further, a UE 116 is operating in the illustrated portion of the LTE network.

When uplink CoMP involves multiple base stations (e.g., as in inter-base station CoMP), the base stations may coordinate with one another via a backhaul network, which allows for communications between base stations and/or other network components. For example, in an LTE network, eNodeBs may communicate via links that are referred to as X2 interfaces. X2 is described generally in Technical Specification ETSI TS 136 420 for LTE; Evolved Universal Terrestrial Radio Access Network (E-UTRAN); X2 general aspects and principles. For example, eNodeBs 112, 132, and 142 in FIG. 1B are communicatively connected via X2 links 140. It should be understood, however, that other types of backhaul communications are also possible. Similarly, while X2 links are not explicitly shown in FIG. 1C, eNodeBs A1 to A4 and eNodeBs B1 to B4 may be interconnected via X2 links or another type of backhaul link.

In both intra-eNodeB and inter-eNodeB CoMP, there may be pre-defined groups of sectors, which may be referred to herein as "CoMP groups" or "CoMP clusters." The eNodeB or eNodeBs that serve the sectors in a CoMP group are configured to provide uplink CoMP using some or all of the sectors in the group.

For example, in FIG. 1C, base stations A1 to A4 and B1 to B4 may be grouped into clusters that can coordinate to provide various types of inter-eNodeB CoMP. In the illustrated scenario, there are two clusters: (i) cluster_A, which includes eNodeBs A1 to A4, and (ii) cluster_B, which includes eNodeBs B1 to B4. Further, in the illustrated scenario, UE 116 is being served by the eNodeBs A1 to A4 in cluster_A. Note that the clusters, such as cluster_A and cluster_B, may be predetermined and static. Alternatively, the LTE network may dynamically and intelligently update the clustering of base stations in an effort to improve service.

In a further aspect, to facilitate inter-eNodeB CoMP, a master base station may be specified for each cluster of eNodeBs. The master base station in a cluster may take the lead to coordinate various functions between the base stations in the cluster. For example, eNodeB A1 may function as the master base station (or master eNodeB) in cluster A, and eNodeB B1 may function as the master base station in cluster B. In some embodiments, the serving base station for each UE may be designated as a master base station for that UE. Other examples, in which a UE's serving base station is not designated as the master base station for that UE, are also possible. Further, the non-master base stations may be referred to herein as coordinating base stations or as neighbor base stations or eNodeBs, or as secondary base stations or eNodeBs.

In a further aspect, the coordinating eNodeB, such as a UE's serving eNodeB, may determine which sectors and/or which eNodeBs from the CoMP group should be used to provide uplink CoMP for a given UE, at a given point in time. In particular, the coordinating eNodeB may determine a subset of the CoMP group that should be utilized for a given UE, based on various factors. Possible factors include, but are not limited to, whether or not a signal from the given UE is received in a candidate sector, signal strength and/or other air interface conditions in the candidate sector, and/or processing load at the eNodeB serving the candidate sector, among other possibilities. In the case of intra-eNodeB uplink CoMP, the process of the eNodeB selecting a subset of sectors from the sectors in its uplink CoMP group to provide uplink CoMP for a particular UE may be referred to as "adaptive sector selection."

In a further aspect, various types of uplink CoMP modes (also referred to herein as CoMP "schemes") are possible. (Note that herein, a given CoMP mode may also be referred to as a CoMP "scheme.") As one example, an interference rejection combining (IRC) mode may be used to reduce or cancel interference at a receiving base station (e.g., the master eNodeB in an inter-eNodeB CoMP cluster), or in the receiving sector, in the case of intra-eNodeB CoMP. When only IRC is implemented, there is very little coordination required between the base stations an inter-eNodeB CoMP group. Therefore, in the case of inter-base-station uplink CoMP, IRC-only does not significantly increase the CPU load at a coordinating base station, nor does it significantly increase the load on the backhaul network (e.g., on X2 links between base stations).

Some uplink CoMP modes may involve joint reception, such that a UE's uplink signal is received in two or more sectors. When joint reception is implemented, multiple UEs can simultaneously transmit on the PUSCH, and may use the same RB when doing so. The PUSCHs may be received in multiple sectors, and in the case of inter-eNodeB CoMP, by multiple eNodeBs. The PUSCHs received in different sectors may be combined using various joint processing techniques, such as a mean squared error (MMSE) or zero forcing (ZF) process. Further, joint reception and joint processing may be combined with other types of uplink CoMP techniques, such as IRC, adaptive antennas, and/or multi-user detection schemes, in an effort to further improve performance and/or for other reasons.

In a further aspect, CoMP modes that include joint processing may be centralized or decentralized to varying degrees. Specifically, in the context of inter base station CoMP, the extent to which a coordinating base station decodes and/or processes a received signal, before sending to the master base station, may vary in different CoMP modes. Since different CoMP modes can increase or decrease in the amount of decoding and/or processing that is done by the coordinating base station, different CoMP modes can in turn increase or decrease the CPU load of the coordinating base station, respectively. Further, increasing the amount of decoding and/or processing that is performed by the coordinating base station may result in less data that is transferred over the backhaul network (e.g., over an X2 link) to the master base station. Specifically, less data may be transferred because, e.g., the size of the decoded signal may be less than the size of the received signal.

As an example, a first type of joint processing may involve a coordinating eNodeB sending the master eNodeB the received signal via an X2 interface, without having decoded the received signal. Specifically, coordinating eNodeB may send raw "I/Q" data (e.g., un-demodulated data symbols) to the master eNodeB via an X2 interface between these two eNodeBs. The raw I/Q data may include all the physical layer bits received by the eNodeB. This first type of joint processing may be referred to herein as "centralized" joint processing.

A second type of joint processing may involve a coordinating eNodeB decoding a received signal before sending it to the master eNodeB. For example, the decoding process may involve the coordinating eNodeB may extracting user data (e.g., packet data) from the physical layer bits in the received signal, such as by removing phase information represented by I/Q bits in the received signal, and/or removing other non-user data from the received signal. The master eNodeB may then compare the decoded signal received from the coordinating eNodeB to its own decoded signal (and possibly decoded signals received from other coordinating eNodeBs) and select the best decoded signal. Alternatively, the master eNodeB may combine the decoded signal from a UE that is received from a coordinating eNodeB with its own the decoded signal from the UE, and/or with one or more other versions of the decoded signal from the UE that are received from other coordinating eNodeBs, in order to generate a combined signal for the particular UE.

This second type of joint processing may be referred to herein as "decentralized" joint processing. It should be understood that varying degrees of decentralized joint processing are possible. That is, the amount of decoding and processing may vary. For example, decentralized joint processing could simply involve decoding the received signal before sending it to the master base station. However, joint processing could further involve compressing the decoded signal before sending it to the master base station (which could help to reduce the load on the backhaul links). Other examples are also possible.

As noted above, decentralized joint processing may reduce the size of the received signal before it is sent to the master base station. Therefore, while decentralized joint processing may increase the CPU load at the coordinating base stations, it can decrease the load on the backhaul link between the coordinating base station and the master base station.

In a further aspect, it should be understood that the above descriptions of joint processing that utilizes signals received and communicated between eNodeBs, can be classified as inter-eNodeB uplink CoMP. The same concepts may be applied in the context of intra-eNodeB joint processing, with the difference being that a single eNodeB will use uplink signals received in two or more sectors it serves for joint processing, instead of using signals sent to the eNodeB by other eNodeBs.

As noted above, a master eNodeB of an inter-eNodeB CoMP cluster may coordinate various functions of CoMP service, such as coordinating communications, determining which cluster members and/or sectors should be utilized for uplink CoMP for a particular UE, and possibly determining which eNodeBs should be included in the cluster. In some instances, a UE's serving eNodeB may act as the master eNodeB and may admit other eNodeBs into a cluster based on their ability to participate in uplink CoMP service for the UE. Recalling terminology introduced above, a UE receiving CoMP service is referred to as a CoMP UE, and eNodeBs in a CoMP cluster are referred to as CoMP eNodeBs. A CoMP UE's serving eNodeB is also a member of the CoMP UE's cluster, and may be the coordinating eNodeB for the cluster. UEs served by a particular eNodeB are referred to as the particular eNodeB's native UEs.

One of the operational factors used in determining if a particular eNodeB is able to participate in uplink CoMP service for a CoMP UE relates to precise timing requirements for air interface communications in LTE. More specifically, decoding by an eNodeB of signals received from multiple UEs on multiple, respective uplinks is carried out simultaneously, and imposes a small tolerance window for unequal arrival times of signals from the multiple UEs during each of sequential decoding intervals. Evaluation of the ability of an eNodeB to participate in uplink CoMP service for a CoMP UE based on timing constraints can be understood by considering certain aspects of LTE air interface transmission.

Returning again to LTE, each coverage area of a base station, such as the eNodeB 112, may operate on one or more RF carriers (or carrier bands) of electromagnetic spectrum. More specifically, carrier bands are allocated to service providers in different RF ranges and in non-overlapping bands of 1.4 MHz, 3 MHz, 5 MHz, 10 MHz, 15 MHz, and/or 20 MHz. Some service providers may have more than one carrier band allocation. Contiguous groupings of carriers can be further organized in frequency within different specified "band channels" used to sub-divide the RF spectrum at a higher level than individual carrier bands.

Any given carrier (or carrier band) can be characterized by a minimum frequency and a maximum frequency, such that the carrier bandwidth is just the difference between the maximum and minimum frequencies. The maximum and minimum frequencies can also be considered as defining band "edges." The carrier bandwidth is sub-divided into K "sub-carriers," each 15 kHz wide, and sub-carriers are arranged in contiguous, non-overlapping groupings of 12 each to make up a frequency dimension of N 180-kHz-wide "resource blocks" of the carrier band, as described in more detail below. The number N depends on the carrier bandwidth. In practice, the total bandwidth of any given LTE carrier is somewhat wider than the N×180 kHz of its N resource blocks. For example, a 20 MHz carrier band has N=100 resource blocks for a total utilized bandwidth of 18 MHz out of the 20 MHz available. As another example, a 10 MHz carrier band has N=50 resource blocks for a total utilized bandwidth of 9 MHz out of the 10 MHz available. Under LTE, the unutilized bandwidth—i.e., bandwidth of sub-carriers that are not included in any of the N resource blocks—is configured in two guard bands, one at each band edge. That is, one guard band occupies spectrum between the first resource block and a first band edge, and the other guard band occupies spectrum between the last resource block and the second band edge.

On each such carrier used for downlink communications, the air interface then defines a Physical Downlink Shared Channel (PDSCH) as a primary channel for carrying data from the base station to UEs, and a Physical Downlink Control Channel (PDCCH) for carrying control signaling from the base station to UEs. Further, on each such carrier used for uplink communications, the air interface defines a Physical Uplink Shared Channel (PUSCH) as a primary channel for carrying data from UEs to the base station, and a Physical Uplink Control Channel (PUCCH) for carrying control signaling from UEs to the base station.

Under LTE, downlink and uplink air interface resources are mapped in the time domain and in the frequency domain. In the time domain, the air interface may be divided into a continuum of 10 millisecond (ms) frames, with each frame being further divided into ten 1-ms sub-frames that are in turn each divided into two 0.5-ms slots. Thus, each frame has 10 sub-frames, and each sub-frame has 2 slots; the 1-ms duration of a sub-frame also defines a "transmission time interval" (TTI). Slots are each further sub-divided into a number (typically 7) of modulation intervals, or "symbol times." In the frequency domain, data for transmission during each symbol time are jointly modulated over a sequence of the K sub-carriers that span the bandwidth of the carrier, using orthogonal frequency division multiplexing (OFDM) to form one OFDM symbol per symbol time. Each OFDM symbol thus corresponds to a frequency superposition of modulated data symbols, which are further organized in frequency into groups, each group spanning 12 contiguous sub-carriers. As noted, each sub-carrier is 15 kHz wide, so each group of 12 sub-carriers occupies a 180 kHz bandwidth.

LTE further defines a particular grouping of resources arrayed across one sub-frame (1 ms) in the time-domain and 12 sub-carriers in the frequency-domain as a resource block, as noted above. Typically, the 1-ms duration of a resource block contains 14 symbol times accommodating 14 OFDM symbols, each a frequency superposition of modulated data symbols spanning 66.7 microseconds (μs) plus a 4.69 μs guard band (cyclic prefix) added to help avoid inter-symbol interference. In practice, the cyclic prefix is commonly considered part of an OFDM symbol, so that the term "OFDM symbol" is taken to refer to the jointly-modulated data symbols plus the pre-pended cyclic prefix. Thus, each resource block contains 14 OFDM symbols by 12 sub-carriers, thereby constituting an array of 168 "resource elements." The air interface may thus support transmission of N resource blocks in each sub-frame. For instance, a 5 MHz carrier supports N=25 resource blocks in each 1-ms sub-frame, whereas a 20 MHz carrier supports N=100 resource blocks in each 1-ms sub-frame. Note that a resource block is sometimes alternatively defined as 7 OFDM symbols of a 0.5 ms slot by 12 sub-carriers in the frequency-domain. Unless stated otherwise, however, a resource block will be taken herein to be 14 OFDM symbols in the time domain (a 1-ms sub-frame).

A resource element is to the smallest unit of resource allocated on the LTE air interface. Each resource element corresponds to one modulated data symbol on one sub-carrier during one symbol time. As noted, a resource block that consists of 12 sub-carriers and 14 OFDM symbols has 168 resource elements. Each modulated symbol, and thus each resource element, can represent a number of bits, with the number of bits depending on the modulation scheme used. For instance, with Quadrature Phase Shift Keying (QPSK) modulation, each modulation symbol may represent 2 bits; with 16 Quadrature Amplitude Modulation (16QAM), each modulation symbol may represent 4 bits; and with 64QAM, each modulation symbol may represent 6 bits. The frequency superposition of all modulation symbols during a given symbol time and across all sub-carriers of a given carrier band (plus a cyclic prefix) thus corresponds to one OFDM symbol.

On transmission, during each TTI (1-ms sub-frame), the N resource blocks of a carrier band are transmitted synchronously as a time sequence of 14 OFDM symbols, each spanning all the sub-carriers of the carrier band. Unused resources—e.g., resource elements and/or resource blocks for which there are no data to transmit, and/or sub-carriers in the guard bands at the carrier edges—may be included "virtually" in the frequency superposition at zero power. The frequency superposition of modulated data symbols is computed as a Fourier superposition. For purposes of the discussion herein, the Fourier superposition may be considered a form of encoding.

In practice, the computation is carried out using well-known fast Fourier transform (FFT) techniques implemented as machine language instructions (e.g., software, firmware, and/or hardware instructions) stored in one or another form of memory and executed by one or more processors. For transmission, an inverse FFT (IFFT) is applied synchronously to all modulated data symbols to be transmitted during each OFDM symbol time, thereby effectively encoding them simultaneously. The process is repeated continuously for each of the data symbols in each subsequent OFDM symbol time. Every sequence of 14 OFDM symbols, time-aligned within a TTI and transmitted on the K sub-carriers of a carrier band, corresponds to N transmitted resource blocks over the TTI duration.

On reception, the N resource blocks are received during each TTI as a time sequence of the 14 transmitted OFDM symbols. An FFT is applied synchronously to each OFDM symbol as it is received in order to decompose the frequency superposition and to recover the modulated data symbols. For purposes of the discussion herein, the Fourier decomposition may be considered a form of decoding. The modulated data symbols of all N resource blocks are thereby recovered, and individual resource blocks can be obtained according to the respective 12-sub-carrier groupings that define the frequency dimensions of each resource block. If the receiver is a UE, after decoding, it will only be able to obtain those resource blocks allocated to it on the downlink.

Within a resource block, different resource elements can serve different functions. For instance, on the downlink, certain resource elements across the bandwidth may be reserved to define the PDCCH for carrying control signals such as page messages and resource allocations from the eNodeB to UEs, and other resource elements may be reserved to define the PDSCH that the eNodeB can allocate to carry transmissions to particular UEs on an as-needed basis. Likewise, on the uplink, certain resource elements across the bandwidth may be reserved to define the PUCCH for carrying control signals such as scheduling requests from UEs to the eNodeB, and other resource elements may be reserved to define the PUSCH that the eNodeB can allocate to carry transmissions from particular UEs on an as-needed basis.

In practice, the PUCCH may define various periodically occurring "scheduling request opportunities" in which a UE, such as UE 116, may transmit scheduling requests to an eNodeB, such as the eNodeB 112. For instance, each scheduling request opportunity for the UE may be a particular resource element on the PUCCH, occurring every fourth transmission TTI (i.e., every 4 ms) or the like. Optimally, the eNodeB would signal to the UE to inform the UE which scheduling request opportunities are for the UE. Thus, the UE can transmit a scheduling request to the eNodeB by simply transmitting a 1-bit or other predefined bit in one of its scheduling opportunities, and the eNodeB may thus monitor the PUCCH for such a scheduling request from the UE.

Upon receipt of scheduling request from the UE, the eNodeB may then schedule uplink transmission by the UE. In particular, the eNodeB may generate and transmit to the UE on the PDCCH "downlink control information" (DCI) that specifies scheduling information in a manner sufficient to inform the UE what resources on the PUSCH the UE should use for transmitting data to the eNodeB. For instance, the DCI may designate particular resource blocks in which the UE may transmit on the PUSCH. In practice, this allocation may be for a TTI that is some predefined time period after the TTI in which the UE sent the scheduling request, such as a TTI that is 4 milliseconds later. Thus, if the UE sends a scheduling request in a particular TTI, then the resource allocation that the UE receives in response to that request may be for resources in a TTI that occurs 4 milliseconds later.

Figure 2A:
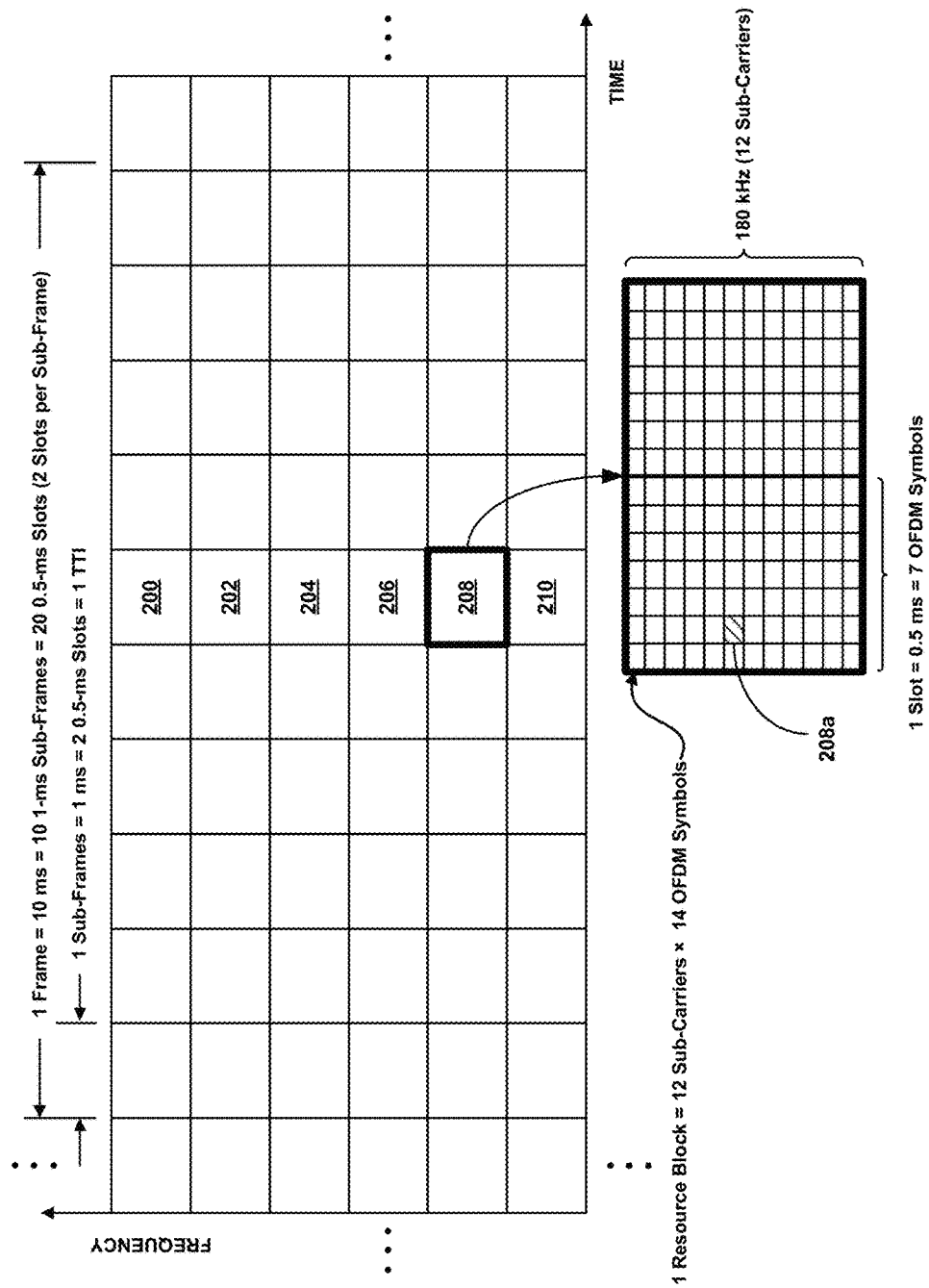
FIG. 2A is a conceptual illustration of a division of a shared communication link into resource blocks, in accordance with example embodiments.

FIG. 2A illustrates how the resources in a given wireless coverage area may be divided in time and frequency domains into resource blocks under LTE. In the time domain, each resource block occupies a 1-ms sub-frame. By way of example, FIG. 2A shows resource blocks 200-210 for a portion of a sub-frame. In the frequency domain, each of the resource blocks 200-210 occupies a respective portion of frequency bandwidth, typically 180 kHz. For purposes of illustration, FIG. 2A shows resource blocks across just six sub-frames in time and six 12-sub-carrier groupings in frequency. However, as noted above, each LTE frame typically has 10 sub-frames, while the number of resource blocks spanning frequency depends on the bandwidth of the carrier. For instance, in a 5 MHz LTE carrier, a total of 25 resource blocks may span frequency during each 1 ms sub-frame. Horizontal and vertical ellipses in the figure represent additional resource blocks in the time and frequency dimensions.

FIG. 2A also includes a more detailed view of resource block 208, illustrating resource elements arrayed in time and frequency. This detailed view shows that the 180 kHz of frequency bandwidth corresponds to 12 sub-carriers of 15 kHz each, and also shows that the 1 ms sub-frame corresponds to the duration of 14 OFDM symbols (although a different number of OFDM symbols per resource block can be used). As noted above, each resource element corresponds to a modulated sub-carrier symbol that is carried on a particular sub-carrier for the duration of one symbol time.

Figure 2B:
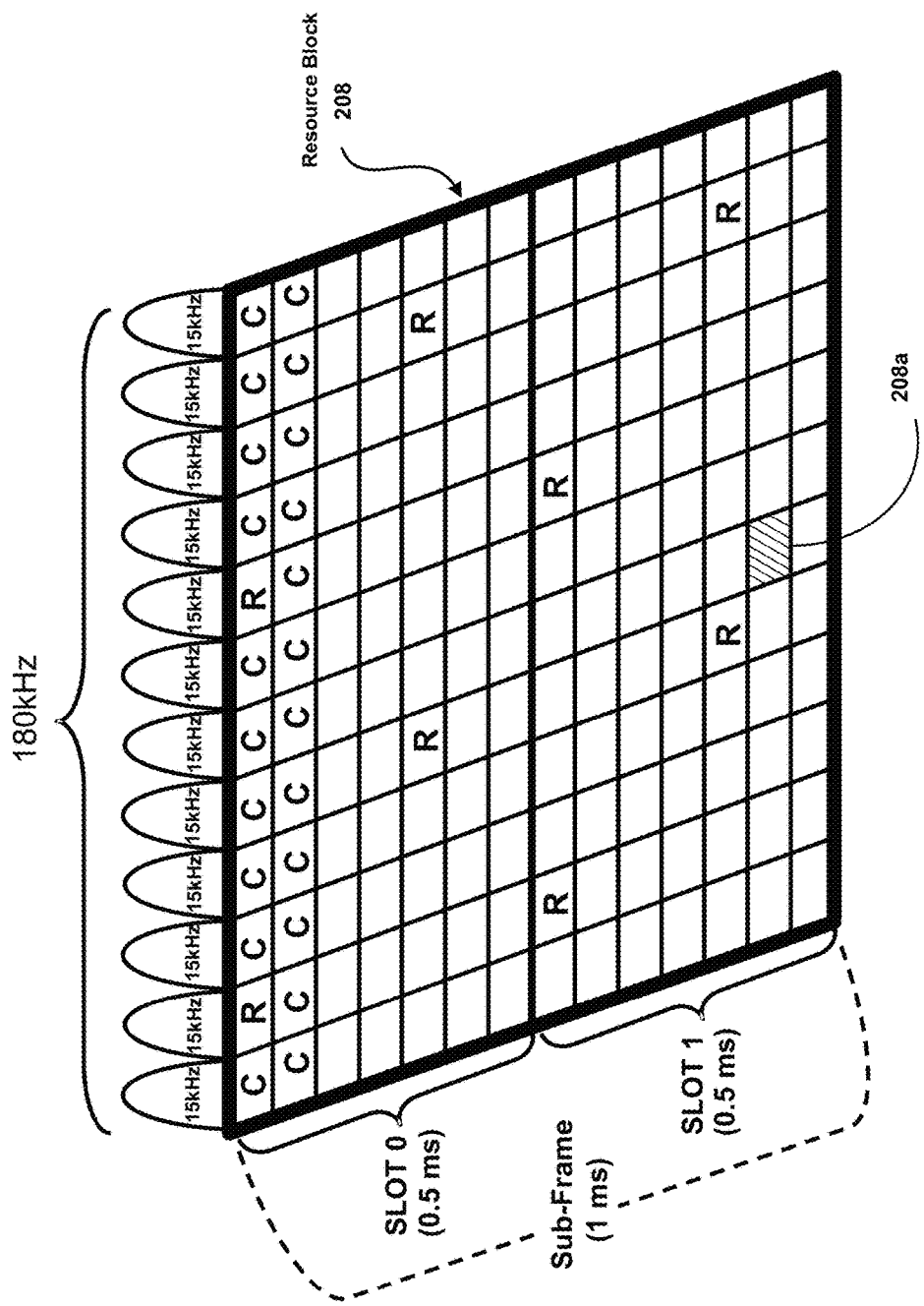
FIG. 2B is a conceptual illustration of a resource block, in accordance with example embodiments.

The use of different resource elements for different purpose is illustrated by way of example for a downlink resource block in FIG. 2B. In this example, 8 of the resource elements are labeled "R" to indicate that they are reserved for reference signals used for channel estimation. In addition, 22 of the resource elements in the first two OFDM symbols are labeled "C" to indicate that they are used to transmit control signaling (including for instance the PDCCH). The other 138 resource elements that are unlabeled can be used to define the PDSCH for transmitting bearer data and other scheduled transmissions. It is to be understood that FIG. 2B illustrates only one possible configuration, and that a resource block could have other configurations as well.

In LTE as currently defined, a physical control format indicator channel (PCFICH) carries signaling overhead information such as an indication of how many 67 μs time segments are being used for control signaling. Additionally, each PDCCH provides UE-specific control information within a number of control channel elements (CCE), each of which is provided as nine resource element groups (REG), with each REG being four resource elements, mapping four quadrature phase shift keying (QPSK) symbols, for a total of 36 QPSK symbols per CCE. The CCEs are numbered with identifiers, and a base station may allocate particular CCEs to particular UEs by specifying the allocations in the PCFICH, with reference to CCE IDs and UE IDs.

Figure 3A:
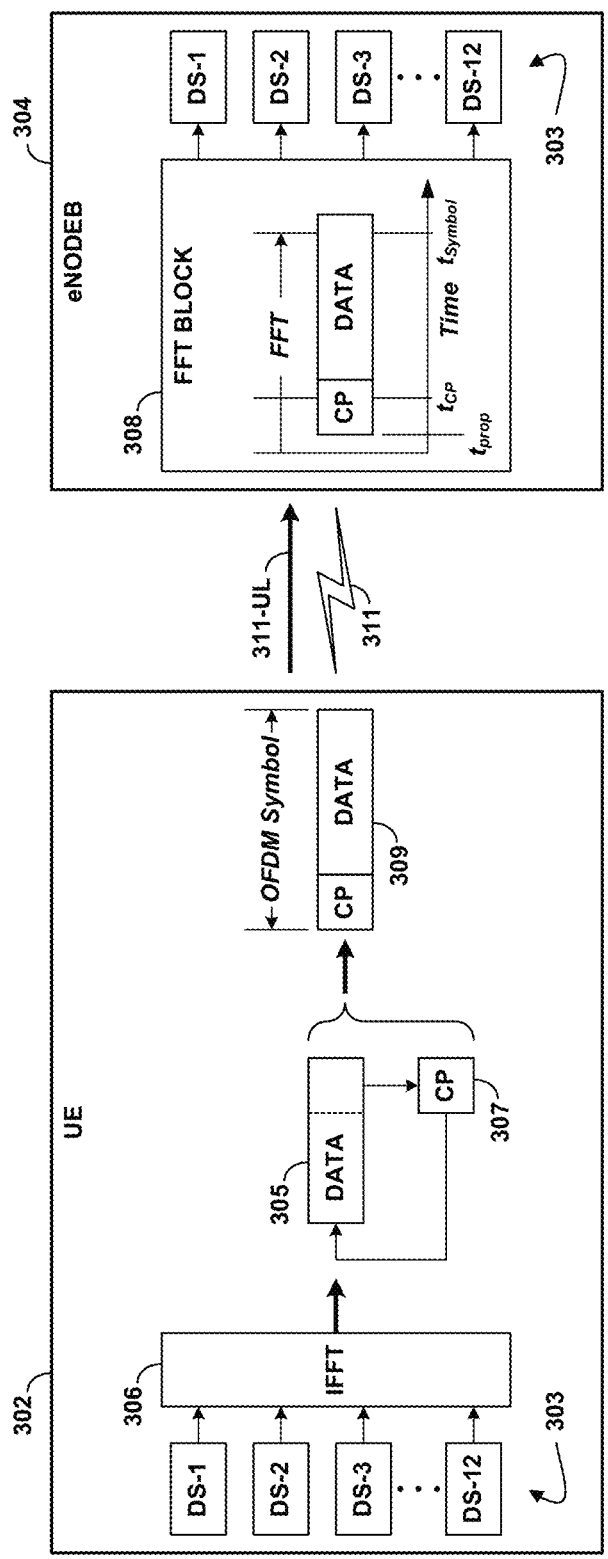
FIG. 3A is a simplified block diagram conceptually illustrating certain aspects of encoding, transmission, and decoding of data, in accordance with example embodiments.

FIG. 3A is a simplified block diagram of a UE 302 and an eNodeB 304, illustrating certain aspects of encoding and transmission of data by the UE, and decoding of the received data by the eNodeB. For purposes of discussion, various details of the UEs and eNodeBs, and of the processing and transmission of the data, are omitted from the figure. As shown, the UE 302 includes an IFFT module 306 that is depicted as simultaneously encoding modulated data symbols 303 during a single example symbol time. By way of example, 12 data symbols, labeled "DS-1," "DS-2," "DS-3," ... "DS-12," are presented to the IFFT module 306. The output of the IFFT module 306 is frequency superposition data 305 spanning one symbol time. A portion of the data 305 at its temporal end (i.e., leading up to the end of the symbol time) is duplicated to form a cyclic prefix 307, which is then pre-pended to the data 305 to form an OFDM symbol 309, as shown. The OFDM symbol 309 is then transmitted to the eNodeB 304 on an uplink 311-UL of an air interface 311 between the UE 302 and the eNodeB 304.

The eNodeB 304 is shown as including an FFT block (or module) 308 for decomposing OFDM symbols to recover modulated data symbols. Thus, in the example illustrated in FIG. 3A, upon reception at the eNodeB 304, the OFDM symbol 309 is processed by the FFT block 308, and the modulated data symbols 303 are recovered. The decomposition processing also illustrates certain aspects related to timing. As illustrated by way of example, owing to a propagation delay between the UE 302 and the eNodeB 304, the OFDM symbol 309 is received at the eNodeB 304 at a time, $t_{prop}$, after the start of the FFT for the corresponding symbol time. As a consequence, the start of FFT processing precedes the arrival time of the OFDM symbol 309 by $t_{prop}$, and FFT processing during the example symbol time ends $t_{prop}$ before the OFDM symbol 309 has been fully received. However, because the arrival time delay is less than the duration of the cyclic prefix, the full cyclic prefix 307 of the OFDM symbol 309 and a sufficient portion of the data 305 are decoded, thereby allowing full decomposition of the data 305 and recovery of the modulated data symbols 303. The same is true for any OFDM symbol having an arrival time within the duration of the cyclic prefix. The duration of the cyclic prefix may thus be considered tolerance for synchronous FFT processing. The cyclic prefix duration is designated at $t_{CP}$, as indicated in the FIG. 3A.

As described above, IFFT processing for computing the frequency superposition and FFT processing for computing the decomposition are both carried out simultaneously over all sub-carriers of a carrier band. In particular, for a base station (or eNodeB) receiving uplink transmissions from multiple UEs, there will be a delay spread among the received signals. However, following from the example illustrated in FIG. 3A, if the delay spread is within $t_{CP}$, uplink OFDM symbols received from the multiple UEs can be decoded (decomposed) simultaneously, and the respectively carried modulated data symbols recovered.

Figure 3B:
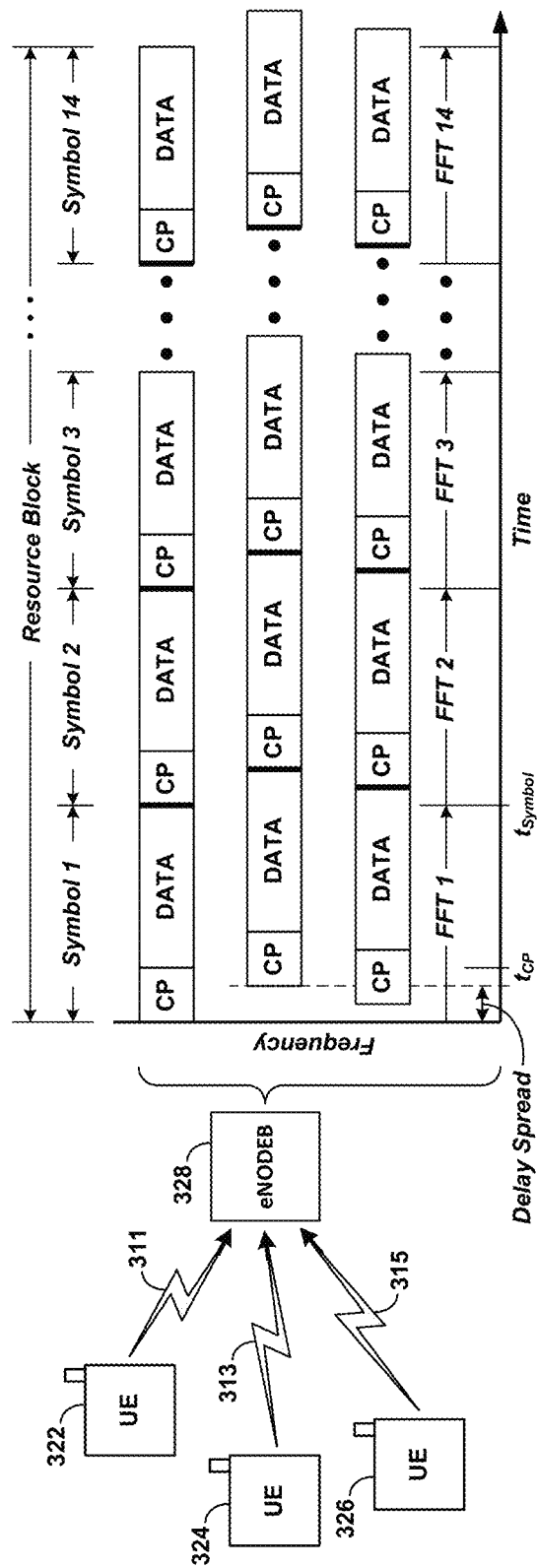
FIG. 3B is a conceptual illustration of certain aspects of reception and decoding at a base station of simultaneous transmissions of data from multiple UEs.

This is illustrated by way of example in FIG. 3B, which shows three UEs 322, 324, and 328 simultaneously transmitting respective uplink resource blocks to a common eNodeB 328 on respective air interface uplinks 311, 313, and 315. Receipt and FFT processing of the respective resource block is depicted graphically in a plot of time on a horizontal axis versus frequency on a vertical axis. The respective resource blocks are depicted at different frequencies meant to represent different groupings of sub-carriers allocated to each of the UEs. Along the time axis, each resource block is displayed as a sequence of OFDM symbols; for the sake of brevity in the figure, only symbols 1, 2, 3, and 14 are shown, with horizontal ellipses between symbols 3 and 14 representing the remaining (but not shown) OFDM symbols. The illustration also includes FFT times, labeled "FFT 1," "FFT 2," "FFT 3," . . . "FFT 14," marked along the time axis, as well as $t_{CP}$ and the first symbol time (which coincides with FFT 1).

Evidently, and by way of example, the arrival time of the start of the resource block from the UE 322 is aligned with the start of FFT 1 (and the start of the first symbol time). Also by way of example, the arrival time of the start of the resource block from the UE 324 is delayed by a time labeled as "Delay Spread" with respect to the start of FFT 1. And, again by way of example, the arrival time of the start of the resource block from the UE 326 is delayed by a time labeled less than the Delay Spread but greater than zero with respect to the start of FFT 1. The delay spread can therefore be considered the spread between the minimum and maximum arrival times. In this example, the delay spread is within $t_{CP}$, so that that first OFDM symbol of each resource block can be properly decoded, as explained in connection with FIG. 3A. The duration of the cyclic prefix, $t_{CP}$, may thus also be considered an "alignment time" for synchronous FFT processing of OFDM symbols.

Because all 14 OFDM symbols of a given resource block are sequentially transmitted by a UE essentially without a delay from one to the next, each of the 14 will be received with the same propagation delay with respect to the start time of its symbol time at the eNodeB. For the current example of FIG. 3B, the delay spread in each successive FFT will be the same, and thus simultaneous decoding of the OFDM symbols received from the UEs 322, 324, and 326 during each symbol time can be achieved.

The time boundary between one TTI and the next TTI marks the temporal end of one resource block and the start of the next. Depending on uplink scheduling, the preceding and following resource blocks can be allocated to different UEs having different propagation delay characteristics. In particular, the end of the preceding resource block can overrun the beginning of the following resource block, a circumstance that can result in inter-symbol interference (ISI) between the last OFDM symbol of the preceding resource block and the first symbol of the following resource block. However, if any potential ISI is temporally contained with the cyclic prefix, both of the OFDM symbols can still be successfully recovered.

Figure 4:
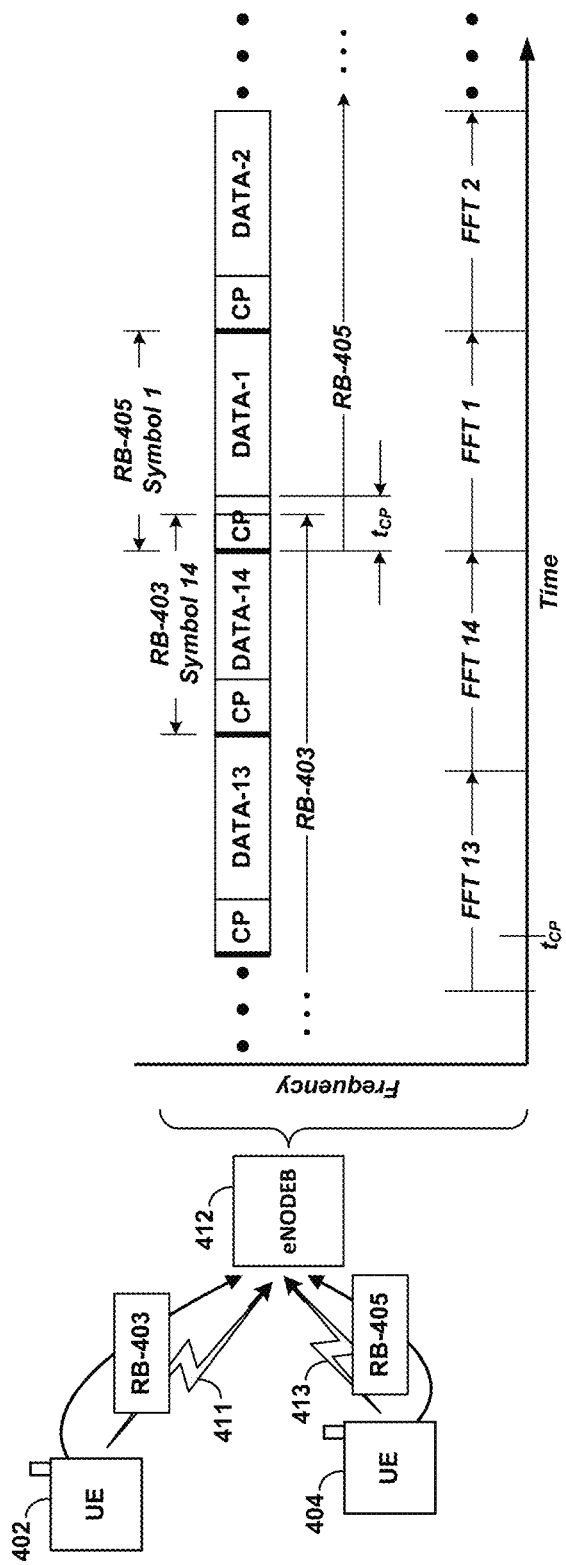
FIG. 4 is a conceptual illustration of certain aspects of reception and decoding at a base station of sequential transmissions of data from two UEs.

This is illustrated in FIG. 4, which shows two UEs 402 and 404 transmitting respective uplink resource blocks RB-403 and RB-405 on uplink air interfaces 411 and 413 to an eNodeB 412 during two successive TTIs. In a plot similar to that in FIG. 3B, the last two OFDM symbols (13 and 14) of RB-403 as depicted as arriving with a delay within the cyclic prefix durations of FFTs 13 and 14, while the first two OFDM symbols (1 and 2) of RB-405 as depicted as arriving with a delay within the cyclic prefix durations of FFTs 1 and 2. As shown, the end of OFDM symbol 14 of RB-403 overlaps the beginning of OFDM symbol 1 of RB-405. But since the overlap is entirely within the cyclic prefix duration of the first FFT (FFT 1) of the TTI containing RB-405, there is a sufficient non-overlapping portion of each OFDM symbol with in its respective FFT processing window for it to be fully decomposed and its contained modulated data symbols recovered.

Figure 5:
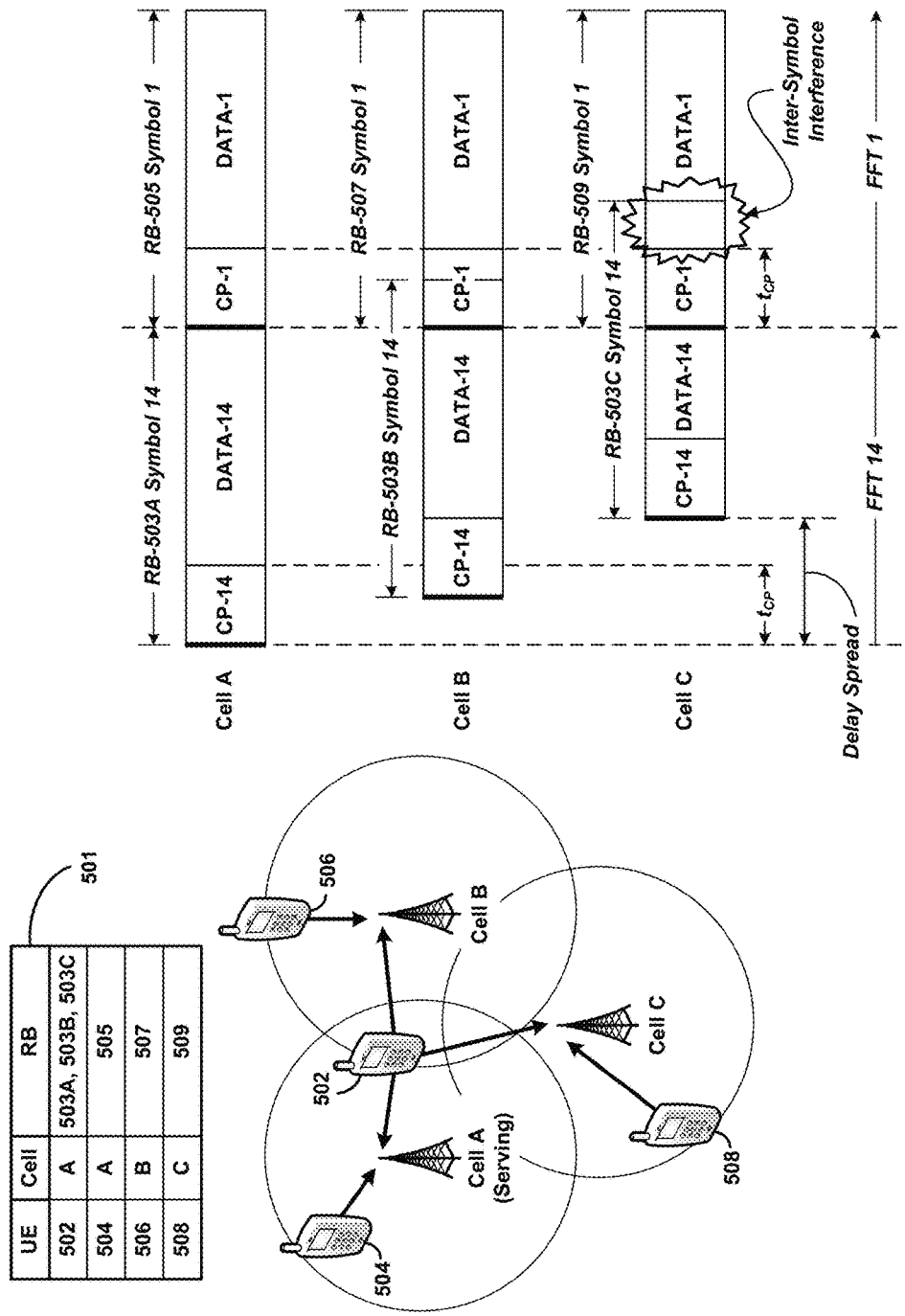
FIG. 5 is a conceptual illustration of certain aspects of reception and decoding at base stations of uplink coordinated multipoint transmissions of data from multiple UEs.

Turning now to timing considerations in uplink CoMP, FIG. 5 illustrates how a delay spread among arrival times at different CoMP eNodeBs of a simultaneously transmitted signal from a CoMP UE can be used to distinguish among CoMP eNodeBs that, as determined under conventional LTE operation, can and cannot participate in uplink CoMP service for the CoMP UE. FIG. 5 also provides an illustrative example for explaining how example embodiments herein can overcome shortcomings of conventional operation.

FIG. 5 depicts a CoMP UE 502 receiving UL CoMP service from a CoMP cluster including three base stations identified simply as "Cell A," "Cell B," and "Cell C." By way of example, Cell A is the serving cell for the CoMP UE 502. In the figure, each cell is represented by a circle surrounding an icon of a base station, and for the purposes of the present discussion, Cells A, B, and C may be considered coverage areas of three different base stations—i.e., three different CoMP base stations. Three arrows each pointing from the CoMP UE 502 to a different one of the three CoMP base stations represent three respective uplinks to the CoMP base stations. Each of the cells is also shown as serving a native UE; for example Cell A serves native UE 504 (as well as CoMP UE 502), Cell B serves native UE 506, and Cell C serves native UE 508. A respective arrow from each of the native UEs 502, 506, and 508 to their respective serving base stations represents a respective uplink.

To illustrate the varying impacts of delay spread, each of the UEs 502, 504, 506, and 508 are assumed to be transmitting respective resource blocks on their uplinks to the their respective serving base stations, where the CoMP UE 502 is simultaneously transmitting its resource block on the three uplinks to the three base stations. Table 501 in the upper left of FIG. 5 identifies which resource block each UE transmits, and to which cell. Specifically, the CoMP UE 502 transmits RB-503A to Cell A, RB-503B to Cell B, and RB-503C to Cell C. Note that all three of these resource blocks carry the same data and are transmitted simultaneously during the same TTI. However, they do not necessarily occupy the same groups of sub-carriers on each of the three uplinks. As also indicated in Table 501, UE 504 transmits RB-505 to Cell A; UE 506 transmits RB-507 to Cell B; and UE 508 transmits RB-509 to Cell A. The particular transmissions in Table 501 are shown as examples.

Arrival and processing of the resource blocks at each base station is shown graphically in a plot on the right side of FIG. 5. For purposes of illustration, and by way of example, each of RB-505, RB-507, and RB-509 is taken to be transmitted in the TTI immediately following the TTI in which RBs-503A,B,C are transmitted. For the sake of brevity in the figure, only the last OFDM symbol (symbol 14) of each of RBs-503A,B,C is shown, and only the first OFDM symbol (symbol 1) of each of RB-505, RB-507, and RB-509 is shown. The horizontal axis of the plot of FIG. 5 represents time, and the vertical axis separates Cells A, B, and C. Also for purposes of illustration, and by way of example, RB-503A and RB-505 (both transmitted to Cell A) are taken to occupy the same sub-carriers; RB-503B and RB-507 (both transmitted to Cell B) are taken to occupy the same sub-carriers; and RB-503C and RB-509 (both transmitted to Cell C) are taken to occupy the same sub-carriers.

In the example illustrated, RB-503A arrives at Cell A with almost no delay. This may be attributable, for example, to Cell A being the serving cell of CoMP UE 502 (e.g., so that CoMP UE 502 is relatively close to Cell A). Continuing with the example, RB-503B arrives at Cell B with a slightly larger delay, but one that is within the cyclic prefix duration $t_{prop}$, as indicated. And RB-503C arrives at Cell C with the largest delay, and one that exceeds the cyclic prefix duration $t_{prop}$. The spread in the three delays among the arrival times at the three cells corresponds to the delay spread, as indicated. Note that this delay spread is defined for arrival times at different base stations of a simultaneous transmission from a single UE, whereas the earlier definition was for arrival times at a single base station of different transmissions from different UEs. The two definitions have the same significance with respect to simultaneous decoding and cyclic prefix duration (as an alignment time).

At Cell A, as illustrated, symbol 1 of RB-505 arrives and begins FFT processing (FFT 1) just as symbol 14 of RB-503A finishes FFT processing (FFT 14). This apparently precise alignment may be attributable, for example, to Cell A being the serving cell of UE 504 (e.g., so that UE 504 is, like CoMP UE 502, relatively close to Cell A). In practice, exact alignment may not occur, but is illustrative of the timing concepts shown in FIG. 5.

At Cell B, symbol 1 of RB-507 arrives and begins FFT processing (FFT 1) with no apparent delay, which may be attributable, for example, to Cell B being the serving cell of UE 506. Owing to the slight delay, symbol 14 of RB-503B overruns the end of FFT processing (FFT 14), and overlaps with the beginning of symbol 1 of RB-507. However, the overlap is contained within the cyclic prefix duration, so both symbol 14 of RB-503B and symbol 1 of RB-507 can be fully decomposed and the carried data symbols recovered, as explained above.

At Cell C, symbol 1 of RB-509 arrives and begins FFT processing (FFT 1) with no apparent delay, which may similarly be attributable, for example, to Cell C being the serving cell of UE 508. Owing to the excessive delay, symbol 14 of RB-503C overruns the end of FFT processing (FFT 14) by more than the cyclic prefix duration, and overlaps with the beginning of symbol 1 of RB-509. In this case, the overlap extends beyond the cyclic prefix duration, resulting in inter-symbol interference, as indicated. Neither of symbol 14 of RB-503C or symbol 1 of RB-509 can be fully, successfully decomposed, so that data recovery may also fail.

In order to avoid the circumstances illustrated in the example of Cell C (and other similar circumstances), under conventional operation in LTE, when propagation delays between a CoMP UE and would-be CoMP base stations are excessive, the would-be CoMP base station may be excluded from participating in CoMP service. Alternatively, the cyclic prefix used for uplink transmissions to a would-be CoMP base station for which the delay is excessive can be adjusted to a larger value in order to accommodate the delay spread by increasing the acceptable range. Either of these conventional approaches have drawbacks, however.

More particularly, one of the benefits of uplink CoMP is derived from an improved service quality attained by combining or merging uplink transmissions (and generally, signals) received by the CoMP base stations of a cluster serving a CoMP UE. As such, excluding a base station from participating in uplink CoMP service for a CoMP UE can diminish the amount of improvement that could otherwise be achieved. On the other hand, extending the duration of the cyclic prefix reduces the data-carrying efficiency of transmissions, because the cyclic prefix represents overhead incurred at the expense of data capacity of an OFDM symbol. As explained in the discussion in connection with FIG. 3A, the cyclic prefix is constructed by duplicating a portion of the frequency superposition data, and thus carries redundant information. Thus, extending the size of the cyclic prefix increases the ratio of redundant information to unique information contained in an OFDM symbol. Both conventional approaches to addressing excessive delay spread in uplink CoMP are therefore lacking. Example methods and systems in described herein compensate for excessive delay spread in uplink CoMP without the drawbacks of the conventional approaches.

In accordance with example embodiments, observed and/or predicted propagation delay between a CoMP UE and a CoMP base station may be determined. If the determined delay is within an alignment time at the CoMP base station for simultaneous decoding of transmissions received from the CoMP base station's native UEs, then the CoMP base station can be deemed suitable for participating in uplink CoMP service for the CoMP UE according, for example, to techniques described above. If instead, the determined delay exceeds the alignment time, then decoding may be time-shifted for transmissions received from the CoMP UE, such that the CoMP UE's uplink transmissions may be successfully decoded, at a delayed start time, and then provided for merging with decoded uplink transmissions received at other CoMP base stations serving the CoMP UE.

In example embodiments under LTE, uplink transmissions may take the form of OFDM symbols organized in resource blocks, and decoding can be FFT processing to decompose received OFDM symbols and recover carried data symbols, as described above. Also, the alignment time may be the cyclic prefix duration. However, other forms of alignment time may be used. In accordance with example embodiments, decoding may be time-shifted by time-shifting the start of FFT processing to coincide with the arrival time of a resource block, or OFDM symbols therein, transmitted by the CoMP UE on an uplink to the CoMP base station.

Also in accordance with example embodiments, the CoMP base station may refrain from scheduling uplink transmissions from other UEs, besides the CoMP UE, on the same sub-carriers used by the CoMP UE and during the TTI immediately following the TTI used by the CoMP UE. In doing so, the CoMP base station can guard against inter-symbol interference due to transmissions from the CoMP UE overrunning those from a subsequently schedule UE. The CoMP base station may instead schedule uplink transmissions from other UEs on different sub-carriers than the CoMP UE and during the immediately-following TTI.

Figure 6:
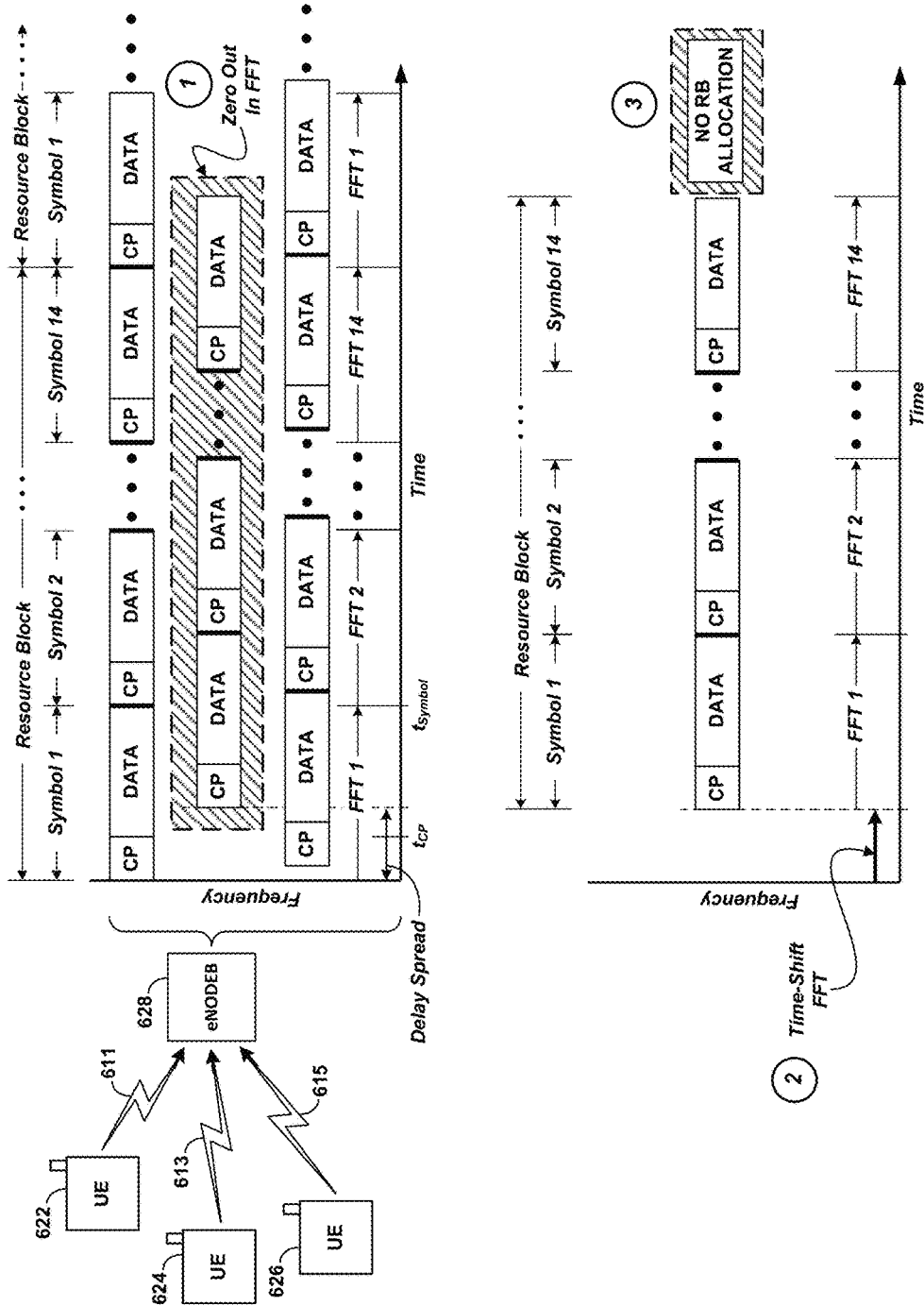
FIG. 6 is a conceptual illustration of an example technique for compensating excessive delay spread in reception and decoding at a base station of uplink coordinated multipoint transmissions of data from multiple UEs, in accordance with example embodiments.

FIG. 6 illustrates example operation in accordance with example embodiments under LTE. The top portion of FIG. 6 includes three UEs 622, 624, and 626 simultaneously transmitting respective uplink resource blocks to a common eNodeB 628 on respective air interface uplinks 611, 613, and 615. Receipt and FFT processing of the respective resource block is depicted in the bottom portion of FIG. 6 in a plot of time on a horizontal axis versus frequency on a vertical axis. The respective resource blocks are depicted at different frequencies meant to represent different groupings of sub-carriers allocated to each of the UEs. Along the time axis, each resource block is displayed as a sequence of OFDM symbols; for the sake of brevity in the figure, only symbols 1, 2, and 14 are shown during a first TTI, and only symbol 1 of the immediately-following TTI is shown (omitted symbols are represented as ellipses). The illustration also includes FFT 1, FFT 2, . . . FFT 14, marked along the time axis, as well as $t_{CP}$ and the first symbol time (which coincides with FFT 1).

By way of example, UEs 622 and 626 are taken to be native to eNodeB 628, which may therefore be their serving base station. UE 624 is taken to a CoMP UE, and eNodeB 628 is a CoMP base station for CoMP UE 624. In example operation, uplink resource blocks from UEs 622 and 626 arrive at eNodeB 628 with delays within $t_{CP}$, as shown. On the other hand, a resource block from CoMP UE 624 has a delay that exceeds $t_{CP}$, as indicated by the Delay Spread. However, rather than disqualify eNodeB 628 from participating in uplink CoMP service for CoMP UE 624, or extending the cyclic prefix, eNodeB 628 may shift the start time of FFT processing for the sub-carriers used on the uplink air interface 613 by CoMP UE 624 to compensate for the excessive delay.

In accordance with example embodiments, this time shifting may be accomplished by operations summarized by way of example in three high-level steps illustrated in FIG. 6. In the first step, labeled "1," FFT processing is carried out across all sub-carriers as described above, but with OFDM symbols from CoMP UE 624 zeroed out. This operation can be considered analogous to how FFT processing would proceed if there had been no uplink transmission on the sub-carriers used by CoMP UE 624. Doing so ensures that the transmissions received from the CoMP UE 624 are not included in the frequency decomposition computations.

In the second step, labeled "2," FFT processing is time-shifted by the delay spread (or the arrival delay of transmissions from CoMP UE 624) and carried out across all sub-carriers as described above, but with OFDM symbols from all uplink sources except CoMP UE 624 zeroed out. This operation can be considered analogous to how FFT processing would proceed if there had been no uplink transmissions on any sub-carriers except those used by CoMP UE 624. Doing so ensures that the transmissions received from all excluded sources are not included in the frequency decomposition computations, which then only yield results for OFDM symbols from CoMP UE 624.

In the third step, labeled "3," the CoMP eNodeB 628 refrains from scheduling any resource block from any UE except the CoMP UE 624 n the TTI immediately following the TTI during which steps 1 and 2 were applied. Doing so helps ensure that the time overrun of the uplink resource block transmitted by CoMP UE 624 will not cause inter-symbol interference in the next TTI with the start of a resource block (i.e., first OFDM symbol) transmitted by a native UE. The third step can be generalized as: (i) for a CoMP UE whose transmissions are received with excessive delay, bias scheduling of uplink of resource blocks in consecutive TTIs and using the same sub-carriers each time; and (ii) for any TTI that follows one used by a CoMP UE whose transmissions are received with excessive delay, schedule all other uplink resource blocks from other UEs on different sub-carriers from those used by the CoMP UE.

Note that the ordering of the above steps as 1, 2, and 3 above is made for convenience of the discussion. The ordering is not necessarily strictly fixed in this manner, and could be altered, or some steps could be carried out in parallel, for example.

In accordance with example embodiments, the CoMP UE's serving base station can coordinate communications and actions among CoMP base stations to determine if any one or more of them should shift their FFT processing for the CoMP UE. For example, a given CoMP eNodeB can report delay information to the serving eNodeB, which can then determine whether or not the given CoMP eNodeB should apply a time shift to processing for the CoMP UE. Alternatively, the given CoMP eNodeB can make the determination itself, and then inform the serving eNodeB, which account for the shift when data from multiple uplinks are merged.

In further accordance with example embodiments, the given eNodeB may also adjust its uplink scheduling to ensure that no other UEs, besides the CoMP UE, are scheduled for the TTI or resource block immediately following a TTI or resource block and sub-carriers used by a CoMP UE for which time shifting of FFTs was applied. In addition the given eNodeB can schedule its native UEs for different sub-carriers than those used by the CoMP UE during the TTI or resource block immediately following a TTI or resource block used by a CoMP UE.

In addition or alternative, the given CoMP eNodeB can still schedule uplinks transmissions by other UEs in the next immediate resource block and on the same sub-carriers. However, in computing the per-symbol FFT of the next uplink resource block, an initial uplink signal received during an initial portion—e.g., the first symbol time—may be zeroed before applying the FFT. This will effectively omits signals during a symbol time that may include inter-symbol interference, while preserving a remaining portion of the next resource block that does not contain symbols subject to ISI. Scheduling adjustments can be left to the given eNodeB, or may be coordinated by the serving eNodeB or some other centralized controlling/scheduling entity.

The delay spread among CoMP base stations of uplink transmissions from a CoMP UE results from different propagation paths from the CoMP UE to the CoMP base stations. Thus, the delay spread represents a distribution of propagation delays, and hence of propagation distances from the CoMP UE to the CoMP base stations. Variations in propagation distances may be due to different line-of-sight distances, as well as multiple propagation paths from the CoMP UE to a given CoMP base station (i.e., "multipath" propagation).

As noted above, in LTE, and OFDM symbol includes about 66.7 μs of data and about 4.69 μs of cyclic prefix. In practice, a slightly larger cyclic prefix is used for the first OFDM symbol of a resource block. Thus, an excessive delay spread—i.e., one that indicates that time-shifting of FFT processing should be applied—corresponds to a delay greater than 4.69 Assuming propagation as the speed of light ($3 \times 10^5$ km per second), the cyclic prefix duration as an alignment time or tolerance corresponds to a distance spread of about 1.4 km.

By way of example, a given CoMP eNodeB may determine propagation delay by monitoring timing signals from the CoMP UE. As another example, the CoMP eNodeB may measure power profiles of signals received from a CoMP UE during each of one or more symbol times. More particularly, the power profile of a received OFDM symbol may peak near the temporal center and decrease relative the peak near the temporal edges. By monitoring rising and falling power of received OFDM symbols from a CoMP UE, and CoMP eNodeB may thus be able to determine how much delay variation seen by the OFDM symbol.

Figure 7:
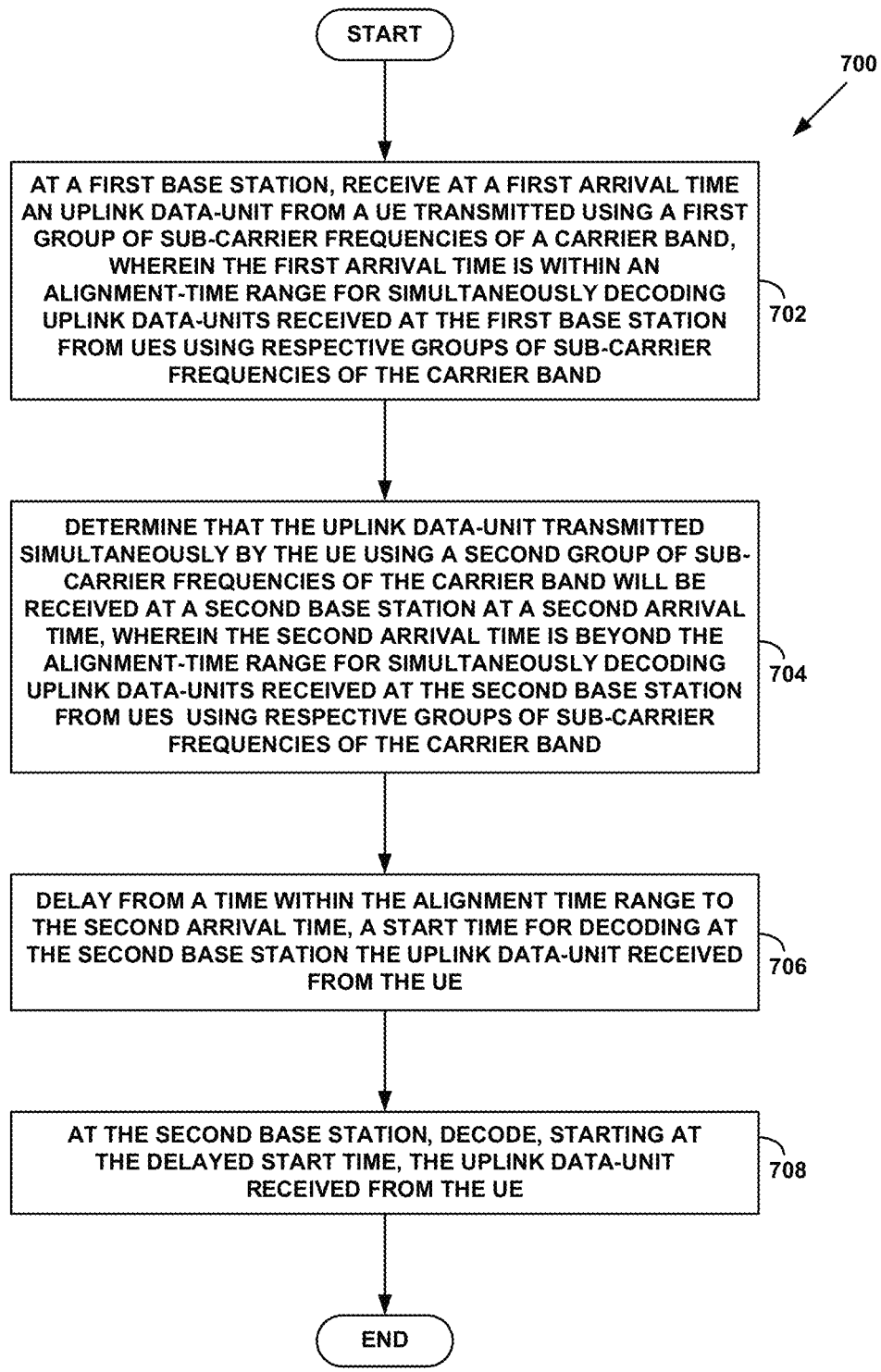
FIG. 7 is a flowchart illustrating an example method for compensating excessive delay spread in reception and decoding at base stations of uplink coordinated multipoint transmissions of data from multiple UEs, in accordance with example embodiments.

FIG. 7 is a flowchart illustrating a method 700, according to an example embodiment. Example methods, such as method 700, may be carried out in whole or in part a wireless communication network by two or more base stations and/or other components, such as by the eNodeB 112 of the representative LTE RAN 100 shown in FIG. 1, using one or more of the air interface arrangements shown in FIGS. 2A-2B. The eNodeB 628 in FIG. 6 is also an example of a network device or component that could be configured to carry out the example method 700, as are other eNodeBs illustrated and/or discussed herein. However, it should be understood that example methods, such as method 700, may be carried out by other entities or combinations of entities as well as in other arrangements, without departing from the scope of the invention. For example, the method 700 may be carried out by a serving eNodeB and a CoMP eNodeB, and may further involve actions by a centralized controlling/coordinating entity. By way of example, the method 700 can be implemented as machine language instructions that can be stored on non-transient machine-readable media (e.g, solid state memory, magnetic disk, etc), and that when executed by one or more processors of a base station to cause the base station to carry out operations, steps, and/or functions of the method.

In an example embodiment, method 700 may operable in a wireless communication network including at least a first base station and a second base station both configured for serving user equipment devices (UEs).

As shown by block 702 in FIG. 7, method 700 involves at the first base station receiving an uplink data-unit transmitted by a UE on a first uplink air interface using a first group of sub-carrier frequencies of a carrier band. The uplink data-unit is received at a first arrival time that is within an alignment-time range for simultaneously decoding respective uplink data-units received from UEs transmitting on the first uplink air interface using respective groups of sub-carrier frequencies of the carrier band.

As shown by block 704 in FIG. 7, method 700 next involves making a determination that the same uplink data-unit transmitted simultaneously by the UE on a second uplink air interface using a second group of sub-carrier frequencies of the carrier band will be received at the second base station at a second arrival time. The second arrival time is beyond the alignment-time range for simultaneously decoding respective uplink data-units received at the second base station from UEs transmitting on the second uplink air interface using respective groups of sub-carrier frequencies of the carrier band.

As shown by block 706 in FIG. 7, method 700 next involves responding to the determination by delaying a start time for decoding at the second base station the uplink data-unit received from the UE on the second uplink air interface. The time delay is made with respect to a time within the alignment time range, and corresponds to delaying the start time until a time at least as great as the second arrival time.

Finally, as shown by block 708, method 700 involves the second base station, decoding the uplink data-unit received from the UE on the second uplink air interface. The decoding begins at the delayed start time, and results in the second base station obtaining a second decoded data-unit.

In accordance with example embodiments, the method 700 may further involve, at the first base station, decoding the uplink data-unit received from the UE on the first uplink air interface. Decoding by the first base station begins at a time within the alignment-time range, and results in the first base station obtaining a first decoded data-unit. The method 700 may then entail merging the first decoded data-unit with the second decoded data-unit.

In further accordance with example embodiments, the wireless communication network may include a third base station configured for serving UEs, and the method 700 may further involve the third receiving the same uplink data-unit transmitted simultaneously by the UE on a third uplink air interface using a third group of sub-carrier frequencies of the carrier band at a third arrival time. The third arrival time is within the alignment-time range for simultaneously decoding respective uplink data-units received at the third base station from UEs transmitting on the third uplink air interface using respective groups of sub-carrier frequencies of the carrier band. The third base station may then decode the uplink data-unit received from the UE on the third uplink air interface. Decoding by the third base station begins at a time within the alignment-time range, and results in the third base station obtaining a third decoded data-unit. The first, second, and third decoded data-unit may then all be merged.

In the method 700, uplink data-units transmitted by UEs have a common duration of one data-unit transmission time, and transmissions of uplink data-units by UEs are scheduled such that they are made: (i) in one or more specified consecutive transmission time windows, each one data-unit transmission time wide, and (ii) over one or more respective groups of sub-carrier frequencies of the carrier band. Additionally, the uplink data-unit transmitted by the UE on the first uplink air interface and simultaneously on the second uplink air interface is transmitted in a particular transmission time window. Also, the alignment-time range has a duration smaller than one data-unit transmission time, and extends from an alignment start-time that coincides with a start-time of the particular transmission time window.

The method 700 then further entails refraining from scheduling transmission of any given uplink data-unit from any given UE, other than the UE, on the second uplink air interface to the second base station, according to certain restrictions. Specifically, no uplink data-unit from any given UE, other than the UE, will be scheduled on the second uplink air interface: (i) in a transmission time window immediately following the particular transmission time window, and (ii) over the second group of sub-carrier frequencies. Conversely, scheduling transmission on the second uplink air interface to the second base station of a subsequent uplink data-unit from the UE will be permitted: (i) in the transmission time window immediately following the particular transmission time window, and (ii) over the second group of sub-carrier frequencies.

In accordance with example embodiments, making the determination that second arrival time will be delayed beyond the alignment-time range may entail determining that a propagation delay from the UE to the second base station exceeds a threshold delay. For example, the threshold delay may correspond to the extent of the alignment-time range.

In further accordance with example embodiments, the sub-carrier frequencies of the carrier band may be orthogonal frequencies, and uplink transmissions may then be made using the sub-carrier frequencies according to orthogonal frequency division multiplexing (OFDM). The uplink data-unit transmitted by the UE on the first uplink air interface may be an OFDM symbol in the form of a frequency superposition of data symbols over a symbol time and over the first group of sub-carrier frequencies. Similarly, the uplink data-unit transmitted simultaneously by the UE on the second uplink air interface may be an OFDM symbol in the form of a frequency superposition of the data symbols over the symbol time and over the second group of sub-carrier frequencies. In this example, decoding the received uplink data-unit at the first base station may then entail applying fast Fourier transform (FFT) processing to the uplink data-unit received at the first base station starting a time within the alignment-time range. Similarly decoding the received uplink data-unit at the second base station may entail applying FFT processing to the uplink data-unit received at the second base station starting a time delayed beyond the alignment-time range.

More particularly, the wireless communication network may operate according to LTE, with the UE being jointly served by the first base station and the second base station according to uplink coordinated multipoint (UL CoMP). In the example method 700, the first base station may be the UE's serving base station and the second base station may be a UL CoMP participating base station for the UE. Further, the uplink data-unit may then be an orthogonal frequency division multiplexing (OFDM) symbol transmitted simultaneously by the UE as part of a first uplink resource block (RB) to the first base station and as part of a second uplink RB to the second base station. In this arrangement, the first and second groups of sub-carrier frequencies may be sub-carrier groups of the first and second uplink RBs, respectively, and the alignment-time range may correspond to a duration of a cyclic prefix of the OFDM symbol, with an alignment start-time that coincides with a transmission start-time for the OFDM symbol. FFT processing of the uplink data-unit received at the first base station may thus entail applying FFT processing to the OFDM symbol received at the first base station starting a time within the cyclic prefix duration. Similarly FFT processing of the uplink data-unit received at the second base station may entail applying FFT processing to the OFDM symbol received at the second base station starting at a time delayed beyond the end of the cyclic prefix duration.

In further accordance with example embodiments, the first uplink RB and the second uplink RB are time-aligned within a particular transmission time interval (TTI). The example method then further entails refraining from scheduling transmission of any given uplink RB from any given UE, other than the UE, on the second uplink air interface to the second base station, according to certain restrictions. Specifically, no uplink RB from any given UE, other than the UE, will be scheduled on the second uplink air interface: (i) in a TTI immediately following the particular TTI, and (ii) over the second group of sub-carrier frequencies. Conversely, scheduling transmission on the second uplink air interface to the second base station of a subsequent uplink RB from the UE will be permitted: (i) in the TTI immediately following the particular TTI, and (ii) over the second group of sub-carrier frequencies. Further, scheduling transmission on the second uplink air interface to the second base station one or more uplink RBs from a given UE, other than the UE will be permitted: (i) in the TTI immediately following the particular TTI, and (ii) over one or more groups of sub-carrier frequencies of the carrier band other than the second group of sub-carrier frequencies.

It will be appreciated that the example method 700 could each include alternate and/or additional steps, while still remaining within the scope and spirit of example embodiments herein.

Figure 8:
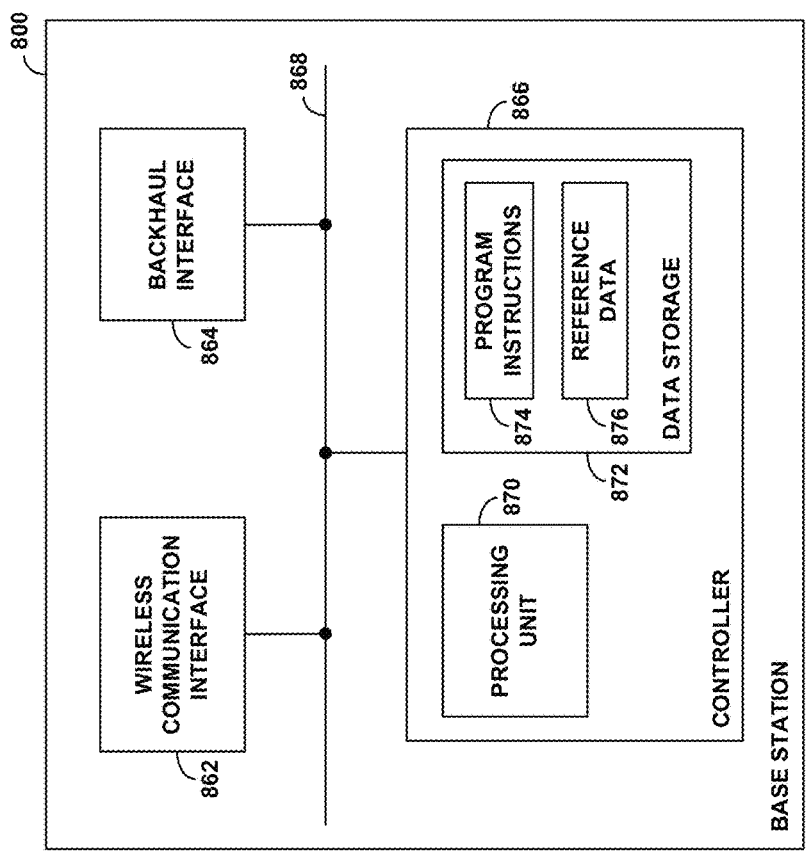
FIG. 8 is a simplified block diagram of an example base station, in accordance with example embodiments.

FIG. 8 is next a simplified block diagram of a base station 800 (such as the eNodeB 112 in FIG. 1 or eNodeB 628 in FIG. 6), showing some of the components that such an entity could include in accordance with an example implementation. In particular, the example base station could configured to act as a serving base station and/or a CoMP base station for a CoMP UE. Further, the example base station could and carry out steps determine delay spread, time-shift FFT processing, and adjust uplink scheduling, as described above. Under LTE, the base station could be an eNodeB. Under other protocols, the base station could take other forms.

As shown in FIG. 8, the example base station includes a wireless communication interface 862, a backhaul interface 864, and a controller 866, all of which could be coupled together or otherwise interconnected by a system bus, network, or other connection mechanism 868. Further, these or other components of the base station could be integrated together in various ways.

In the example base station, the wireless communication interface 862 could be configured to engage in wireless communication with UE via an air interface between the base station and the UE. As such, the wireless communication interface could include a radio compliant with the protocol that the base station will use for communication with the UE station, such as LTE for instance, and could further include an OFDM transceiver and an antenna structure for transmitting on a downlink and receiving on an uplink of the air interface. The backhaul interface 864 may then be a wired or wireless interface for communicating with various core network entities, such as with an SGW and MME as discussed above for instance.

The controller 866, in turn, could be configured to control operation of the base station including implementing various base station operations described herein, such as to determining delay spread, performing FFT processing, time-shifting FFT processing, and scheduling uplink transmission from UEs, as described above.

As shown by way of example, the controller 866 could include a processing unit 870 and data storage 872. Processing unit 870 could comprise one or more general purpose processors (e.g., microprocessors) and/or one or more special-purpose processors (e.g., application specific integrated circuits or digital signal processors). And data storage 872 could comprise one or more non-transitory volatile and/or non-volatile storage components, such as magnetic, optical, or flash memory, and could hold or be encoded with program instructions 874 and reference data 876. Program instructions 874 could be executable by processing unit 870 to carry out various base station operations described herein. And reference data 876 could include various data to facilitate carrying out the operations, such as those described above.

Exemplary embodiments have been described above. Those skilled in the art will understand, however, that changes and modifications may be made to these embodiments without departing from the true scope and spirit of the invention.

We claim:

1. A method operable in a wireless communication network including at least a first base station and a second base station both configured for serving user equipment devices (UEs), the method comprising:
   at the first base station, receiving, at a first arrival time, an uplink data-unit transmitted by a UE on a first uplink air interface using a first group of sub-carrier frequencies of a carrier band, wherein the first arrival time is within an alignment-time range for simultaneously decoding respective uplink data-units received at the first base station from UEs transmitting on the first uplink air interface using respective groups of sub-carrier frequencies of the carrier band;
   making a determination that the uplink data-unit transmitted simultaneously by the UE on a second uplink air interface using a second group of sub-carrier frequencies of the carrier band will be received at the second base station at a second arrival time, wherein the second arrival time is beyond the alignment-time range for simultaneously decoding respective uplink data-units received at the second base station from UEs transmitting on the second uplink air interface using respective groups of sub-carrier frequencies of the carrier band;

in response to making the determination, delaying from a time within the alignment time range to the second arrival time, a start time for decoding at the second base station the uplink data-unit received from the UE on the second uplink air interface; and at the second base station, decoding, starting at the delayed start time, the uplink data-unit received from the UE on the second uplink air interface, thereby obtaining a second decoded data-unit.

2. The method of claim 1, further comprising:

at the first base station, decoding, starting at a time within the alignment-time range, the uplink data-unit received from the UE on the first uplink air interface, thereby obtaining a first decoded data-unit; and merging the first decoded data-unit with the second decoded data-unit.

3. The method of claim 2, wherein the wireless communication network further includes a third base station configured for serving UEs, the method further comprising:

at the third base station, receiving, at a third arrival time, the uplink data-unit transmitted simultaneously by the UE on a third uplink air interface using a third group of sub-carrier frequencies of the carrier band, wherein the third arrival time is within the alignment-time range for simultaneously decoding respective uplink data-units received at the third base station from UEs transmitting on the third uplink air interface using respective groups of sub-carrier frequencies of the carrier band;

at the third base station, decoding, starting at a time within the alignment-time range, the uplink data-unit received from the UE on the third uplink air interface, thereby obtaining a third decoded data-unit; and merging the third decoded data-unit with the merged first and second decoded data-units.

4. The method of claim 2, wherein the sub-carrier frequencies of the carrier band are orthogonal frequencies, and uplink transmissions are made using the sub-carrier frequencies according to orthogonal frequency division multiplexing (OFDM), wherein the uplink data-unit transmitted by the UE on the first uplink air interface is an OFDM symbol comprising a frequency superposition of data symbols over a symbol time and over the first group of sub-carrier frequencies, wherein the uplink data-unit transmitted simultaneously by the UE on the second uplink air interface is an OFDM symbol comprising a frequency superposition of the data symbols over the symbol time and over the second group of sub-carrier frequencies, wherein, at the first base station, decoding, starting at a time within the alignment-time range, the uplink data-unit received from the UE on the first uplink air interface comprises applying fast Fourier transform (FFT) processing to the uplink data-unit received from the UE on the first uplink air interface starting a time within the alignment-time range, and wherein, at the second base station, decoding, starting at the delayed start time, the uplink data-unit received from the UE on the second uplink air interface comprises applying FFT processing to the uplink data-unit received from the UE on the second uplink air interface starting a time delayed beyond the alignment-time range.

5. The method of claim 2, wherein the wireless communication network operates according to LTE, wherein the UE is jointly served by the first base station and the second base station according to uplink coordinated multipoint (UL CoMP), wherein the first base station is the UE's serving base station and the second base station is a UL CoMP participating base station for the UE, wherein the uplink data-unit is an orthogonal frequency division multiplexing (OFDM) symbol transmitted simultaneously by the UE as part of a first uplink resource block (RB) to the first base station and as part of a second uplink RB to the second base station, wherein the first and second groups of sub-carrier frequencies are sub-carrier groups of the first and second uplink RBs, respectively, wherein the alignment-time range corresponds to a duration of a cyclic prefix of the OFDM symbol, and has an alignment start-time coinciding with a transmission start-time for the OFDM symbol, wherein, at the first base station, decoding, starting at a time within the alignment-time range, the uplink data-unit received from the UE on the first uplink air interface comprises applying fast Fourier transform (FFT) processing to the OFDM symbol received from the UE on the first uplink air interface starting a time within the cyclic prefix duration, and wherein, at the second base station, decoding, starting at the delayed start time, the uplink data-unit received from the UE on the second uplink air interface comprises applying FFT processing to the OFDM symbol received from the UE on the second uplink air interface starting at a time delayed beyond the end of the cyclic prefix duration.

6. The method of claim 5, wherein the first uplink RB and the second uplink RB are time-aligned within a particular transmission time interval (TTI), and wherein the method further comprises:

refraining from scheduling transmission on the second uplink air interface to the second base station any given uplink RB from any given UE, other than the UE, (i) in a TTI immediately following the particular TTI, and (ii) over the second group of sub-carrier frequencies;

permitting scheduling transmission on the second uplink air interface to the second base station of a subsequent uplink RB from the UE (i) in the TTI immediately following the particular TTI, and (ii) over the second group of sub-carrier frequencies; and permitting scheduling transmission on the second uplink air interface to the second base station one or more uplink RBs from a given UE, other than the UE, (i) in the TTI immediately following the particular TTI, and (ii) over one or more groups of sub-carrier frequencies of the carrier band other than the second group of sub-carrier frequencies.

7. The method of claim 1, wherein uplink data-units transmitted by UEs have a common duration of one data-unit transmission time, wherein transmissions of uplink data-units by UEs are scheduled (i) in one or more specified consecutive transmission time windows, each one data-unit transmission time wide, and (ii) over one or more respective groups of sub-carrier frequencies of the carrier band, wherein the uplink data-unit transmitted by the UE on the first uplink air interface and simultaneously on the second uplink air interface is transmitted in a particular transmission time window, wherein the alignment-time range has a duration smaller than one data-unit transmission time, and extends from an alignment start-time that coincides with a start-time of the particular transmission time window, and wherein the method further comprises:

refraining from scheduling transmission on the second uplink air interface to the second base station any given uplink data-unit from any given UE, other than the UE, (i) in a transmission time window immediately following the particular transmission time window, and (ii) over the second group of sub-carrier frequencies; and permitting scheduling transmission on the second uplink air interface to the second base station of a subsequent uplink data-unit from the UE (i) in the transmission time window immediately following the particular transmission time window, and (ii) over the second group of sub-carrier frequencies.

8. The method of claim 7, further comprising:

permitting scheduling transmission on the second uplink air interface to the second base station one or more uplink data-units from a given UE, other than the UE, (i) in the transmission time window immediately following the particular transmission time window, and (ii) over one or more groups of sub-carrier frequencies of the carrier band other than the second group of sub-carrier frequencies.

9. The method of claim 1, wherein making the determination comprises determining that a propagation delay from the UE to the second base station exceeds a threshold delay.

10. A wireless communication network comprising:

a first base station for serving user equipment devices (UEs), the first base station including a transceiver;

a second base station for serving UEs, the second base station including a transceiver;

one or more processors distributed at least among the first base station and the second base station; and memory accessible to the one or more processors, and storing machine language instructions that, upon execution by the one or more processors, cause the wireless communication network to carry out operations including:

receiving by the transceiver of first base station at a first arrival time, an uplink data-unit transmitted by a UE on a first uplink air interface using a first group of sub-carrier frequencies of a carrier band, wherein the first arrival time is within an alignment-time range for simultaneously decoding respective uplink data-units received at the first base station from UEs transmitting on the first uplink air interface using respective groups of sub-carrier frequencies of the carrier band;

making a determination that the uplink data-unit transmitted simultaneously by the UE on a second uplink air interface using a second group of sub-carrier frequencies of the carrier band will be received by the transceiver of the second base station at a second arrival time, wherein the second arrival time is beyond the alignment-time range for simultaneously decoding respective uplink data-units received at the second base station from UEs transmitting on the second uplink air interface using respective groups of sub-carrier frequencies of the carrier band;

in response to making the determination, delaying from a time within the alignment time range to the second arrival time, a start time for decoding at the second base station the uplink data-unit received from the UE on the second uplink air interface; and at the second base station, decoding, starting at the delayed start time, the uplink data-unit received from the UE on the second uplink air interface, thereby obtaining a second decoded data-unit.

11. The wireless communication network of claim 10, wherein the operations further include:

at the first base station, decoding, starting at a time within the alignment-time range, the uplink data-unit received from the UE on the first uplink air interface, thereby obtaining a first decoded data-unit; and merging the first decoded data-unit with the second decoded data-unit.

12. The wireless communication network of claim 11, wherein the wireless communication network further comprises a third base station for serving UEs, the third base station including a transceiver, wherein the one or more processors are further distributed among the third base station, and wherein the operations further include:

receiving by the transceiver of third base station at a third arrival time, the uplink data-unit transmitted simultaneously by the UE on a third uplink air interface using a third group of sub-carrier frequencies of the carrier band, wherein the third arrival time is within the alignment-time range for simultaneously decoding respective uplink data-units received at the third base station from UEs transmitting on the third uplink air interface using respective groups of sub-carrier frequencies of the carrier band;

at the third base station, decoding, starting at a time within the alignment-time range, the uplink data-unit received from the UE on the third uplink air interface, thereby obtaining a third decoded data-unit; and merging the third decoded data-unit with the merged first and second decoded data-units.

13. The wireless communication network of claim 11, wherein the sub-carrier frequencies of the carrier band are orthogonal frequencies, and uplink transmissions are made using the sub-carrier frequencies according to orthogonal frequency division multiplexing (OFDM), wherein the uplink data-unit transmitted by the UE on the first uplink air interface is an OFDM symbol comprising a frequency superposition of data symbols over a symbol time and over the first group of sub-carrier frequencies, wherein the uplink data-unit transmitted simultaneously by the UE on the second uplink air interface is an OFDM symbol comprising a frequency superposition of the data symbols over the symbol time and over the second group of sub-carrier frequencies, wherein, at the first base station, decoding, starting at a time within the alignment-time range, the uplink data-unit received from the UE on the first uplink air interface comprises applying fast Fourier transform (FFT) processing to the uplink data-unit received from the UE on the first uplink air interface starting a time within the alignment-time range, and wherein, at the second base station, decoding, starting at the delayed start time, the uplink data-unit received from the UE on the second uplink air interface comprises applying FFT processing to the uplink data-unit received from the UE on the second uplink air interface starting a time delayed beyond the alignment-time range.

14. The wireless communication network of claim 11, wherein the wireless communication network operates according to LTE, wherein the UE is jointly served by the first base station and the second base station according to uplink coordinated multipoint (UL CoMP), wherein the first base station is the UE's serving base station and the second base station is a UL CoMP participating base station for the UE, wherein the uplink data-unit is an orthogonal frequency division multiplexing (OFDM) symbol transmitted simultaneously by the UE as part of a first uplink resource block (RB) to the first base station and as part of a second uplink RB to the second base station, wherein the first and second groups of sub-carrier frequencies are sub-carrier groups of the first and second uplink RBs, respectively, wherein the alignment-time range corresponds to a duration of a cyclic prefix of the OFDM symbol, and has an alignment start-time coinciding with a transmission start-time for the OFDM symbol, wherein, at the first base station, decoding, starting at a time within the alignment-time range, the uplink data-unit received from the UE on the first uplink air interface comprises applying fast Fourier transform (FFT) processing to the OFDM symbol received from the UE on the first uplink air interface starting a time within the cyclic prefix duration, and wherein, at the second base station, decoding, starting at the delayed start time, the uplink data-unit received from the UE on the second uplink air interface comprises applying FFT processing to the OFDM symbol received from the UE on the second uplink air interface starting at a time delayed beyond the end of the cyclic prefix duration.

15. The wireless communication network of claim 14, wherein the first uplink RB and the second uplink RB are time-aligned within a particular transmission time interval (TTI), and wherein the operations further include:

refraining from scheduling transmission on the second uplink air interface to the second base station any given uplink RB from any given UE, other than the UE, (i) in a TTI immediately following the particular TTI, and (ii) over the second group of sub-carrier frequencies;

permitting scheduling transmission on the second uplink air interface to the second base station of a subsequent uplink RB from the UE (i) in the TTI immediately following the particular TTI, and (ii) over the second group of sub-carrier frequencies; and permitting scheduling transmission on the second uplink air interface to the second base station one or more uplink RBs from a given UE, other than the UE, (i) in the TTI immediately following the particular TTI, and (ii) over one or more groups of sub-carrier frequencies of the carrier band other than the second group of sub-carrier frequencies.

16. The wireless communication network of claim 10, wherein uplink data-units transmitted by UEs have a common duration of one data-unit transmission time, wherein transmissions of uplink data-units by UEs are scheduled (i) in one or more specified consecutive transmission time windows, each one data-unit transmission time wide, and (ii) over one or more respective groups of sub-carrier frequencies of the carrier band, wherein the uplink data-unit transmitted by the UE on the first uplink air interface and simultaneously on the second uplink air interface is transmitted in a particular transmission time window, wherein the alignment-time range has a duration smaller than one data-unit transmission time, and extends from an alignment start-time that coincides with a start-time of the particular transmission time window, and wherein the operations further include:

refraining from scheduling transmission on the second uplink air interface to the second base station any given uplink data-unit from any given UE, other than the UE, (i) in a transmission time window immediately following the particular transmission time window, and (ii) over the second group of sub-carrier frequencies;

permitting scheduling transmission on the second uplink air interface to the second base station of a subsequent uplink data-unit from the UE (i) in the transmission time window immediately following the particular transmission time window, and (ii) over the second group of sub-carrier frequencies; and permitting scheduling transmission on the second uplink air interface to the second base station one or more uplink data-units from a given UE, other than the UE, (i) in the transmission time window immediately following the particular transmission time window, and (ii) over one or more groups of sub-carrier frequencies of the carrier band other than the second group of sub-carrier frequencies.

17. A base station configured for operating in a wireless communication network and for serving user equipment devices (UEs), the base station comprising:

a transceiver;

one or more processors;

and memory accessible to the one or more processors, and storing machine language instructions that, upon execution by the one or more processors, cause the base station to carry out operations including:

making a determination that an uplink data-unit transmitted by a UE on an uplink air interface using a group of sub-carrier frequencies of a carrier band will be received by the transceiver of the base station at an arrival time, wherein the arrival time is beyond an alignment-time range for simultaneously decoding respective uplink data-units received at the base station from UEs transmitting on the uplink air interface using respective groups of sub-carrier frequencies of the carrier band;

in response to making the determination, delaying from a time within the alignment time range to the arrival time, a start time for decoding the uplink data-unit received from the UE on the uplink air interface; and decoding, starting at the delayed start time, the uplink data-unit received from the UE on the uplink air interface, thereby obtaining a decoded data-unit.

18. The base station of claim 17, wherein the UE has a serving base station in the wireless communication network, other than the base station, wherein the UE simultaneously transmits the uplink data-unit to the serving base station on a serving uplink air interface using a serving group of sub-carrier frequencies of the carrier band, wherein the simultaneously transmitted uplink data-unit is received at the serving base station at an earlier arrival time that is within an alignment-time range for simultaneously decoding respective uplink data-units received at the serving base station from UEs transmitting on the serving uplink air interface using respective groups of sub-carrier frequencies of the carrier band, wherein the serving base station decodes, starting at a time within the alignment-time range, the uplink data-unit received from the UE on the serving uplink air interface, thereby obtaining a serving decoded data-unit and wherein the operations further include:

providing the decoded data-unit for merging with the serving decoded data-unit.

19. The base station of claim 18, wherein the wireless communication network operates according to LTE, wherein the UE is jointly served by the serving base station and the base station according to uplink coordinated multipoint (UL CoMP), wherein the base station is a UL CoMP participating base station for the UE, wherein the uplink data-unit is an orthogonal frequency division multiplexing (OFDM) symbol transmitted simultaneously by the UE as part of a serving uplink resource block (RB) to the serving base station, and as part of a CoMP uplink RB to the base station, wherein the group of sub-carrier frequencies is a sub-carrier group of the CoMP uplink RB, and the serving group of sub-carrier frequencies is a sub-carrier group of the serving uplink RB, wherein the alignment-time range corresponds to a duration of a cyclic prefix of the OFDM symbol, and has an alignment start-time coinciding with a transmission start-time for the OFDM symbol, wherein, decoding, starting at the delayed start time, the uplink data-unit received from the UE on the uplink air interface comprises applying fast Fourier transform (FFT) processing to the OFDM symbol received from the UE on the uplink air interface starting at a time delayed beyond the end of the cyclic prefix duration, and wherein, the serving base station decodes, starting at a time within the alignment-time range, the uplink data-unit received from the UE on the serving uplink air interface by applying FFT processing to the OFDM symbol received from the UE on the serving uplink air interface starting a time within the cyclic prefix duration.

20. The base station of claim 19, wherein the uplink RB and the serving uplink RB are time-aligned within a particular transmission time interval (TTI), and wherein the operations further include:

refraining from scheduling transmission on the uplink air interface to the base station any given uplink RB from any given UE, other than the UE, (i) in a TTI immediately following the particular TTI, and (ii) over the group of sub-carrier frequencies;

permitting scheduling transmission on the uplink air interface to the base station of a subsequent uplink RB from the UE (i) in the TTI immediately following the particular TTI, and (ii) over the group of sub-carrier frequencies; and permitting scheduling transmission on the uplink air interface to the base station one or more uplink RBs from a given UE, other than the UE, (i) in the TTI immediately following the particular TTI, and (ii) over one or more groups of sub-carrier frequencies of the carrier band other than the group of sub-carrier frequencies.

* * * * *